US012116254B2

(12) United States Patent
Puszkiewicz

(10) Patent No.: US 12,116,254 B2
(45) Date of Patent: Oct. 15, 2024

(54) MULTIFUNCTIONAL BOOM SYSTEM

(71) Applicant: Oshkosh Corporation, Oshkosh, WI (US)

(72) Inventor: Ignacy Puszkiewicz, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/111,677

(22) Filed: Feb. 20, 2023

(65) Prior Publication Data

US 2023/0264932 A1 Aug. 24, 2023

Related U.S. Application Data

(60) Provisional application No. 63/312,267, filed on Feb. 21, 2022.

(51) Int. Cl.

*B66F 9/065* (2006.01)
*B66C 23/42* (2006.01)
*B66C 23/70* (2006.01)
*B66F 9/075* (2006.01)

(52) U.S. Cl.

CPC ............ *B66F 9/0655* (2013.01); *B66C 23/42* (2013.01); *B66C 23/701* (2013.01); *B66F 9/0755* (2013.01); *B66C 2700/0357* (2013.01)

(58) Field of Classification Search

CPC ...... B66F 9/0655; B66C 23/42; B66C 23/701
See application file for complete search history.

(56) References Cited

U.S. PATENT DOCUMENTS 3,759,399 A * 9/1973 Glass ........................ B66C 1/22 212/347
3,774,217 A * 11/1973 Bonner ................... B66C 13/40 182/148
9,527,700 B2 * 12/2016 Gerber .................. B66C 23/703
10,920,434 B1 2/2021 Pearson, Jr.
2005/0111948 A1 * 5/2005 Nolasco .................. B60P 3/125 414/563
2008/0019815 A1 * 1/2008 Harris ..................... B66C 23/80 414/542

FOREIGN PATENT DOCUMENTS

EP 2 258 643 A1 12/2010
WO WO-2018/009980 A1 1/2018

OTHER PUBLICATIONS

International Search Report and Written Opinion issued in connection with PCT Appl. Ser. No. PCT/US2023/013411 dated Jun. 22, 2023.

* cited by examiner

*Primary Examiner* — Ronald P Jarrett
(74) *Attorney, Agent, or Firm* — Foley & Lardner LLP

(57) ABSTRACT

A boom system includes a base assembly and a boom assembly. The boom assembly includes a boom including a plurality of boom sections. The plurality of boom sections includes a lower boom section coupled to and extending away from the base assembly and defining a proximal end of the boom and an upper boom section defining a distal end of the boom. The boom assembly further includes an attachment coupler assembly coupled to a boom section other than the upper boom section and configured to receive a first implement. The boom assembly further includes an implement connector positioned at the distal end of the boom, the implement connector configured to receive a second implement.

17 Claims, 24 Drawing Sheets

700

MULTIFUNCTIONAL BOOM SYSTEM

CROSS-REFERENCE TO RELATED PATENT APPLICATIONS

This application claims the benefit of and priority to U.S. Provisional Patent Application No. 63/312,267, filed Feb. 21, 2022, the disclosure of which is incorporated herein by reference in its entirety.

BACKGROUND

The present disclosure relates to boom lifting devices. More particularly, the present disclosure relates to multi-functional boom lifting devices and control methods for the same.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One exemplary embodiment relates to a boom system including a base assembly and a boom assembly. The boom assembly includes a boom including a plurality of boom sections. The plurality of boom sections includes a lower boom section coupled to and extending away from the base assembly and defining a proximal end of the boom and an upper boom section defining a distal end of the boom. The boom assembly further includes an attachment coupler assembly coupled to a boom section other than the upper boom section and configured to receive a first implement. The boom assembly further includes an implement connector positioned at the distal end of the boom, the implement connector configured to receive a second implement.

Another exemplary embodiment relates to an extendable boom comprising a plurality of boom sections and a cradle configured to be coupled to a boom section other than an uppermost boom section. The cradle is configured to restrict rotation of an elongated load suspended from the uppermost boom section.

Still another exemplary embodiment relates to a boom system including a boom with a plurality of boom sections. The plurality of boom sections includes a lower boom section defining a proximal end of the boom and an upper boom section defining a distal end of the boom. Each boom section other than the lower boom section is configured to extend and retract independently from the other boom sections. The boom system includes a controller communicably coupled with a plurality of linear actuators coupled to the boom. Each linear actuator is configured to cause a boom section to extend or retract or to cause an angle of the boom relative to a work surface to increase or decrease. The controller includes one or more memory devices coupled to one or more processors. The one or more memory devices are configured to store instructions thereon that, when executed by the one or more processors, cause the one or more processors to communicate with the linear actuators to control the extension of the boom sections and the angle of the boom relative to the work surface.

BRIEF DESCRIPTION OF THE DRAWINGS

The disclosure will become more fully understood from the following detailed description, taken in conjunction with the accompanying figures, wherein like reference numerals refer to like elements, in which:

FIG. 9 is a side view of a boom system in various configuration according to an exemplary embodiment.

Figure 1A:
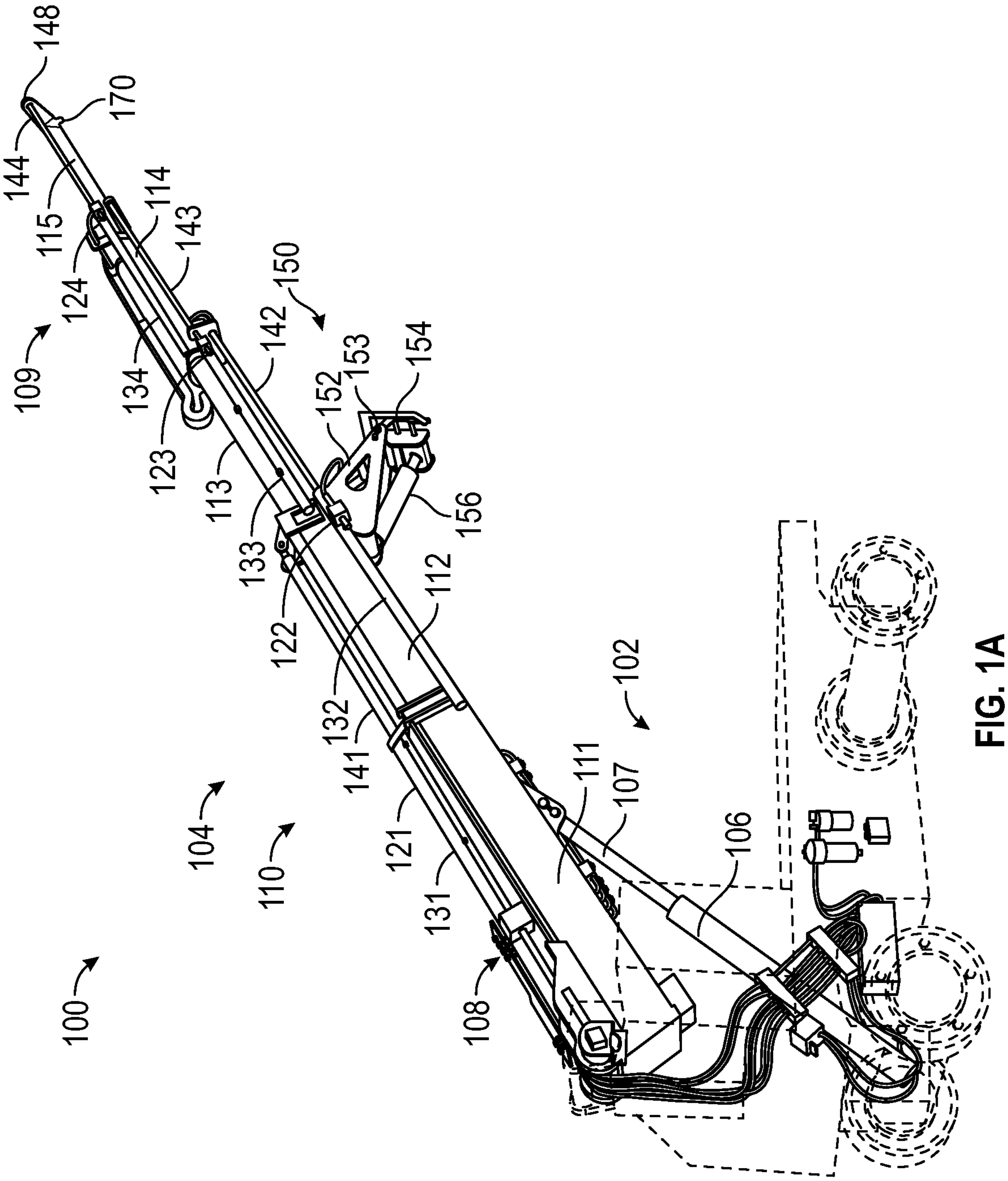
FIG. 1A is a side view of a boom system with a boom in an extended configuration according to an exemplary embodiment.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present application is not limited to the details or methodology set forth in the description, illustrated in the figures. It should also be understood that the terminology is for the purpose of description only and should not be regarded as limiting.

Boom lifting devices, including telehandlers, cranes, and man lifts, are used to lift and move loads on a work site. Typically, the lifts are specialized tools. For example, a telehandler is typically used for lifting palletized loads from below with forklift forks, while a crane is typically used for lifting loads from above with a hook and straps or rope. On a job site, there may be some loads that must be lifted from below and some that are lifted from above. Differences in the weight of the load to be lifted or the distance or height the load is to be lifted may also typically necessitate different machines. Accordingly, it would be desirable to provide a single machine capable of performing the functions of multiple typical machines.

Further, elongated loads lifted by a crane may rotate or swing, particularly if a tagline is not used. In some cases, the elongated load may swing and contact the boom itself. This may result in damage to the crane or the load. Accordingly it may be advantageous to provide a device positioned on the boom to restrict the rotation and swinging of elongated loads.

Overview

Referring generally to the FIGURES, a boom system is shown according to various exemplary embodiments. The boom system includes a base assembly, a multifunctional boom assembly, and one or more implement connection points for attaching implements (e.g., forklift forks, crane hooks, etc.). The base assembly supports the multifunctional boom assembly. The multifunctional boom assembly may include a boom that comprises multiple sections. The sections may be coaxial and may be configured to be driven to extend by linear actuators, such as hydraulic cylinders, electromechanical actuators, etc. As the sections extend and retract, the multifunctional boom assembly may increase or decrease in length, thereby raising and lowering the implement or moving the implement closer or farther from the base assembly. Advantageously, the boom system may include multiple implement attachment points at different positions in the boom. For example, forklift forks may be attached at an intermediate position on the boom and a crane hook may be attached at the end of the boom. This may allow the same boom system to perform the functions of both a boom crane and a telehandler. This can reduce cost because only one machine is needed instead of two, can save time because one machine does not have to be swapped out and replaced with another, and takes up less space on a worksite, which can be important on smaller, cramped sites.

The base assembly may include one or more tractive elements (e.g., tires, tracks, etc.). The tractive elements may each include a motor configured to drive the corresponding tractive element. In some embodiments, the tractive elements can be independently driven by the corresponding motor. In some embodiments, the base assembly may include a turn table that is rotatably coupled to the rest of the base assembly. The multifunctional boom assembly may be coupled to the turn table to allow for rotation of the multifunctional boom assembly relative to the rest of the base assembly. The base assembly may include a control system configured to move and steer the boom system based on user input or preprogrammed commands, e.g. by turning the tractive elements or operating the motors of the tractive elements at different speeds. The control system may include one or more human machine interfaces (e.g. a steering wheel, pedals, levers, etc.) configured to receive user inputs. The control system may also be configured to receive user inputs to operate any of the other motors, linear actuators, etc., of the boom system, for example, to control the extension and position of the multifunctional boom assembly. The controller may generate control signals for any of the electric motors, electric linear actuators, etc. The controller can also monitor feedback (e.g., voltage feedback, current feedback, etc.) from any of the electric linear actuators, electric motors, etc.

The boom system can include energy storage devices (e.g., batteries). Any of the motors, controller, linear actuators, etc., of the boom system can receive power from the energy storage devices. In some embodiments, the boom system may be powered by an internal combustion engine using chemical fuel. The boom system may include an alternator configured to convert rotational energy from the internal combustion engine to electrical energy to power electrical components of the boom system.

Coaxial Multi-Implement Boom

Referring to FIG. 1A, a boom system 100 is shown according to an exemplary embodiment. The boom system 100 includes a base assembly 102 and a multifunctional boom assembly 104. The base assembly 102 may include or be coupled to a linear actuator 106 (e.g., a hydraulic cylinder, an electromechanical actuator, etc.) with an extendable portion 107 (e.g., a piston of a hydraulic cylinder, a rod of an electromechanical actuator, etc.) coupled to the multifunctional boom assembly 104 and configured to control the angle of the multifunctional boom assembly 104, including the boom 110, relative to the ground or work surface. The multifunctional boom assembly 104 includes a boom 110 that includes five sections 111, 112, 113, 114, 115. In various embodiments, the boom 110 may include more or fewer than five sections. The boom system may be arranged, for example, similar to a telehandler with a counterweight on one end of the base assembly 102 and the boom 110 extending from the base assembly 102 in a direction opposite the counterweight. The lowermost section (e.g., the lower section, the base section, the proximal section, the most proximal section, etc.), for example, section 111, defines a proximal end 108 of the boom 110. The uppermost section (e.g., the upper section, the distal section, the most distal section etc.), for example, section 115, defines a distal end 109 of the boom 110. The extendable portion 107 of the linear actuator 106 may be coupled the lowermost section (e.g., section 111). The sections may also be referred to herein, for example, as a first section (e.g., section 111), a second section (e.g., section 112), a third section (e.g., section 113), a fourth section (e.g., section 114), and a fifth section (e.g., section 115). The sections may also be referred to as a lower boom section (e.g., section 111), intermediate boom sections (e.g., sections 112-114), and an upper boom section (e.g., section 115).

The sections of the boom 110 may be aligned coaxially along a longitudinal centerline of each boom section. The boom sections other than the lower boom section may be configured to extend and retract to increase and decrease a length of the boom 110. The boom sections other than the lower boom section may configured to extend and retract independently of the other boom sections Each section may form a hollow tube (e.g., a rectangular tube) of increasing size, such that each section may telescopically retract into and nest inside an inner cavity of the next (e.g., adjacent, more proximal, etc.) section. For example, section 115 may nest inside of section 114, section 114 may nest inside of section 113, section 113 may nest inside of section 112, and section 112 may nest inside of section 111. When the boom is fully retracted, each section may be considered retracted into the inner cavity of all of the more proximal sections. For example, section 115 may be considered retracted into the inner cavities of sections 111-114. The inner dimensions of each tube section may be larger than the outside dimensions of the respective smaller tube section, such that the smaller tube section fits inside the respective larger tube section. A linear actuator (e.g., a hydraulic cylinder, an electromechanical actuator, etc.) is mounted to each of sections

111-114 and is configured to extend a respective smaller, more distal section. As discussed above, in various embodiments, the boom 110 may include more or fewer than five sections. For example, the boom 110 may include as few as two sections, with one section extending from the other. In other embodiments, the boom 110 may include six or more sections.

Each of the linear actuators comprises a base portion (e.g., a barrel of a hydraulic cylinder, a body of an electromechanical actuator, etc.) and an extendable portion (e.g., a piston of a hydraulic cylinder, a rod of an electromechanical actuator, etc.) configured to extend from the base portion. The base portion of one of the linear actuators may be coupled to each of the boom sections other than the upper boom section, and the respective extendable portion may be coupled to an adjacent boom section. The extension of the extendable portion from the base portion may cause the adjacent boom section to extend in the direction of the distal end 109 of the boom 110. For example, the base portion 131 of actuator 121 is mounted to section 111, and the extendable 141 of actuator 121 is coupled to section 112. When the extendable portion 141 is extended, section 112 is pushed out from section 111 in the direction of the distal end 109 of the boom 110 into an extended position. Similarly, the base portion 132 of actuator 122 is mounted to section 112, and the extendable portion is coupled to section 113; the base portion 133 of a actuator 123 is mounted to section 113, and the extendable portion 143 of the actuator 123 is coupled to section 114; and the base portion 134 of actuator 124 is mounted to section 114, and the extendable portion 144 is coupled to section 115. In various embodiments, the actuators may be mounted to the top, bottom, or either side of the boom 110. As discussed below, each actuator may be independently controlled, such that each section 112-115 may be extended to a different length and at different times.

The multifunctional boom assembly 104 may include an attachment coupler assembly 150 configured to receive an implement (e.g., different types of forklift forks, a cradle attachment, etc.). The attachment coupler assembly 150 is be coupled to one of the sections. In some embodiments, the attachment coupler assembly 150 is coupled to one of the sections other than the upper boom section (e.g., sections 111-114 and not section 115). In the embodiment shown in FIG. 1A, the attachment coupler assembly 150 is coupled to a distal end of the second boom section (e.g., section 112). The attachment coupler assembly 150 is mounted to section 112 via a frame 152. A coupler plate 154 is mounted to the frame 152. The coupler plate 154 may be rotatably coupled to the frame 152 at an attachment point 153, such that the angle of the coupler plate 154 relative to the boom 110 may be adjusted. For example, a linear actuator 156 (e.g., a hydraulic cylinder, an electromechanical actuator, etc.) may be coupled to the coupler plate 154 and be configured to extend a piston to adjust the angle of the coupler plate 154. The coupler plate 154 may be configured to receive the implement. For example, forklift forks and other attachments commonly attached to telehandlers and forklifts may be adapted to removably attach to the coupler plate when required. As discussed below, a cradle attachment may also be configured to be removably coupled to the coupler plate 154.

An implement connector for a second implement (e.g., a crane hook, a lifting shackle, etc.) may be positioned at an end 148 of an uppermost section of the boom 110 (e.g., section 115). The end 148 of the uppermost section of the boom 110 defines a distal tip of the boom 110. The implement connector may be, for example, a lifting ring, hook, or search hook coupled to the uppermost section of the boom 110 or coupled to a rope running though the interior, or along the exterior of the boom 110 and out of the end 148 of the uppermost section. The other end of the rope may be coupled to and wrapped around a drum of a winch, for example, in the base assembly 102. The winch may be coupled to a motor controlled by a controller and may be configured to rotate to unwrap the winch and lower the crane hook in response to a user input or programmed command. The winch may rotate in the opposite direction to wrap the rope and raise the crane hook. In some embodiments, the uppermost section of the boom 110 (e.g., section 115) may include a search hook or another implement to which loads can be attached. Because the attachment coupler assembly 150 may be coupled to an intermediate boom section rather than the upper boom section, the moment caused by the attachment coupler assembly 150 when the boom 110 is fully extended is lower, which increases the lifting capacity of the boom when the second implement is used.

Figure 1B:
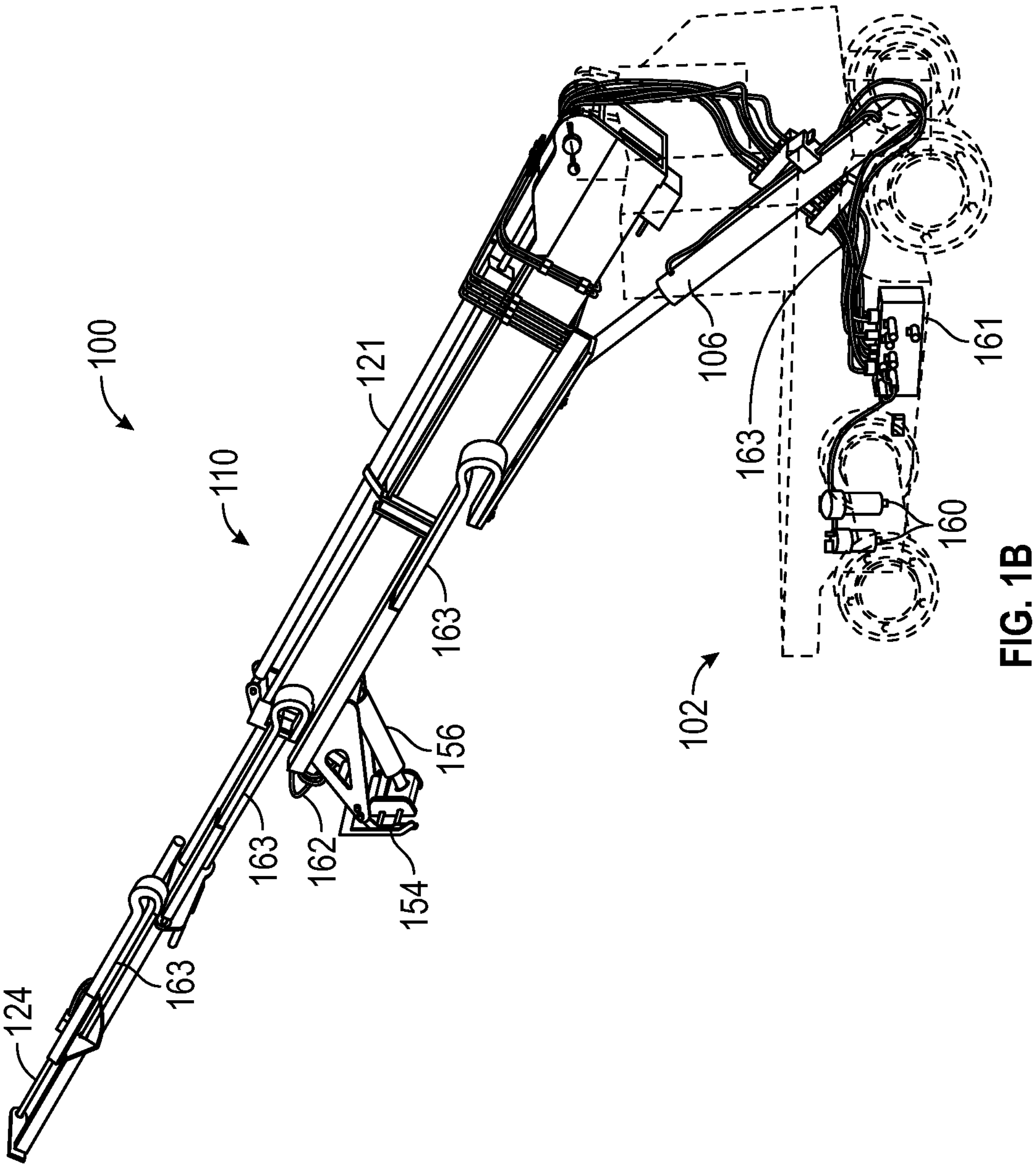
FIG. 1B is a side view of the boom system of FIG. 1A.

FIG. 1B is a reverse view of the boom system 100 of FIG. 1A. In embodiments in which the actuators are hydraulic cylinders, hydraulic pumps 160 provide hydraulic pressure to the actuators 106, 121, 122, 123, 124, 156 via a valve assembly 161 and a plurality of hoses 162. As shown in FIG. 1B, the hoses 162 may be run through hose carriers 163 (e.g., hose tracks, cable tracks, etc.) from the pumps 160 and the valve assembly 161 to the actuators 106, 121, 122, 123, 124, 156, so that the hoses remain organized and out of the way of other moving parts as the boom 110 extends and retracts. In embodiments in which the actuators are electromechanical actuators, wires may run from a battery in the base assembly 102 through cable tracks to the actuators to power the actuators.

Advantageously, the boom system 100 may perform the functions of both a telehandler and a crane. Forklift forks may be attached to the coupler plate 154 of the attachment coupler assembly 150 and may be used to lift heavy loads and/or palletized loads. The crane hook may allow for lifting of lighter loads higher and farther from the base assembly 102. As an example method of operating the boom system 100, forklift forks may be coupled to a lower section of the boom 110, for example, via the attachment coupler assembly 150. Next, the forklift forks may be used to lift and move a pallet or package of items. Once the pallet or package has been set down, the forklift forks may be removed. A lifting device, such as a crane hook, may then be coupled to an upper section of the boom system 100. In some embodiments, the lifting device may remain coupled while the forks are in use. The package or pallet can then be opened or de-palletized. The lifting device can then be used to lift one of the items for installation or to move it to another location. For example, the boom system 100 may be used as a telehandler to lift and transport a pallet containing commercial lighting fixtures to an installation location using forklift forks. Once the lighting fixtures are de-palletized and unpacked, the boom system may be used as a crane using a crane hook to install each individual lighting fixture.

Figure 2:
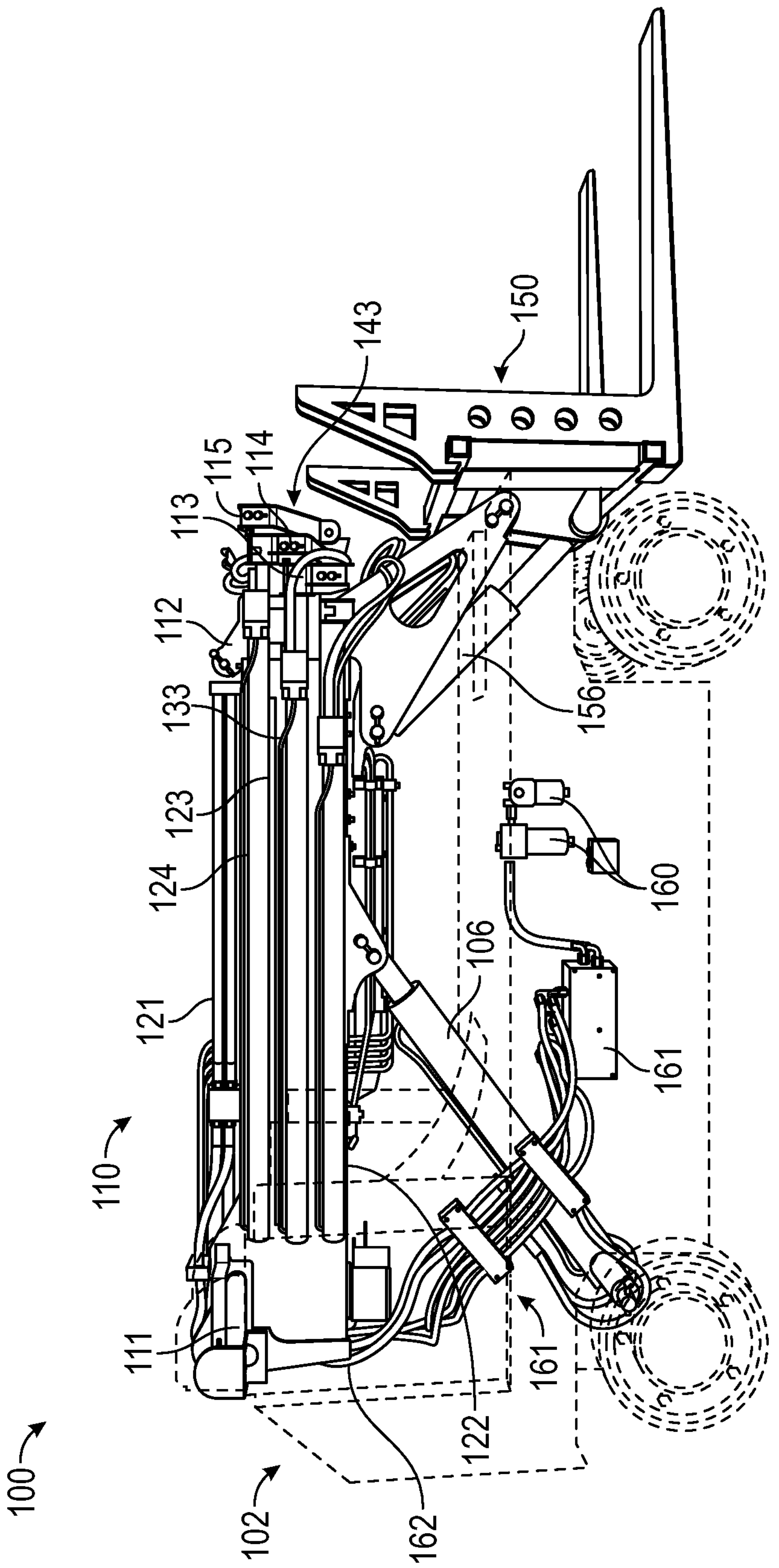
FIG. 2 is a side view of the boom system of FIG. 1 with the boom in a retracted configuration.
Figure 3A:
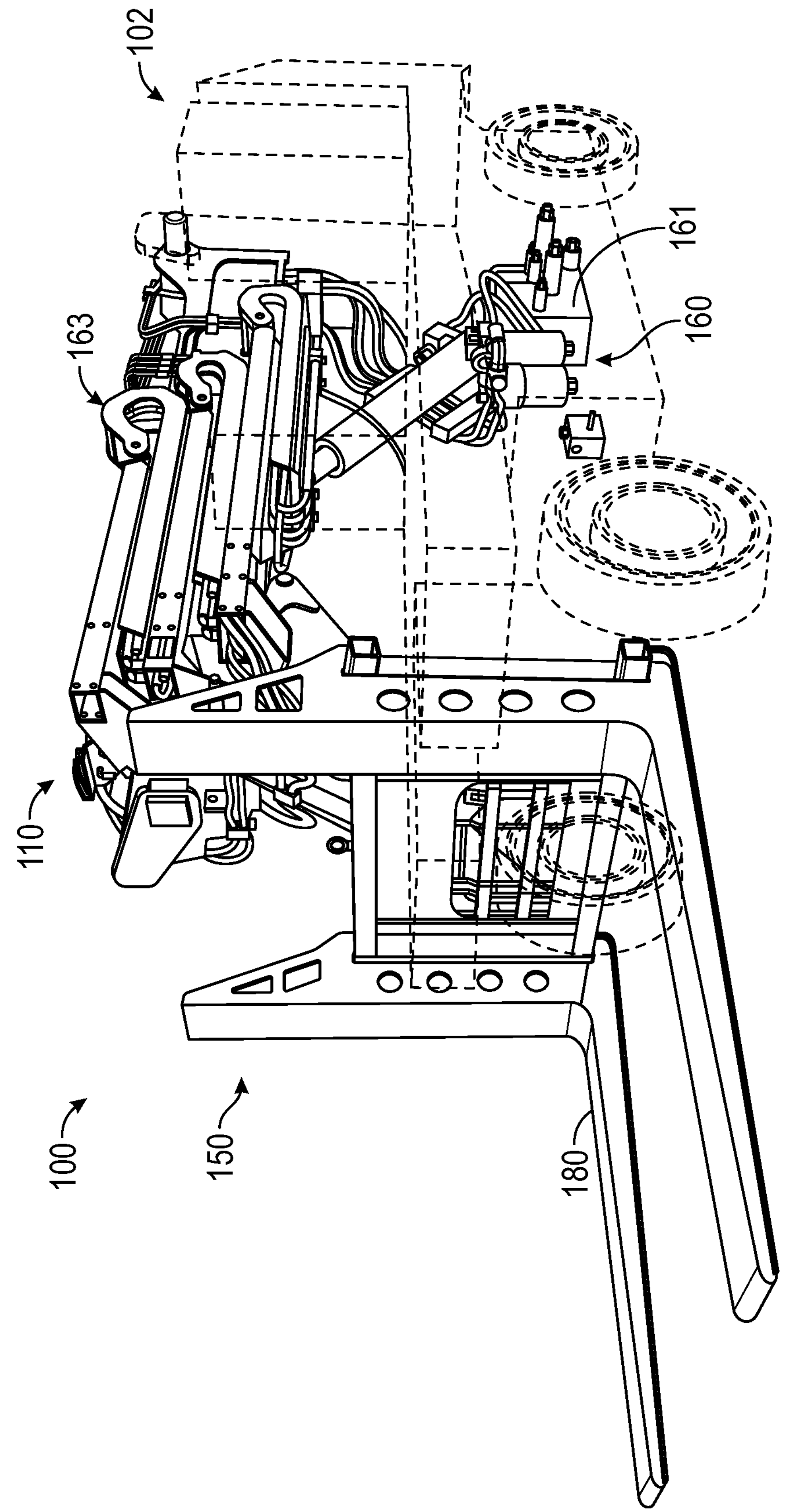
FIG. 3A is a perspective view of the boom system of FIG. 1 with the boom in a retracted configuration.
Figure 3B:
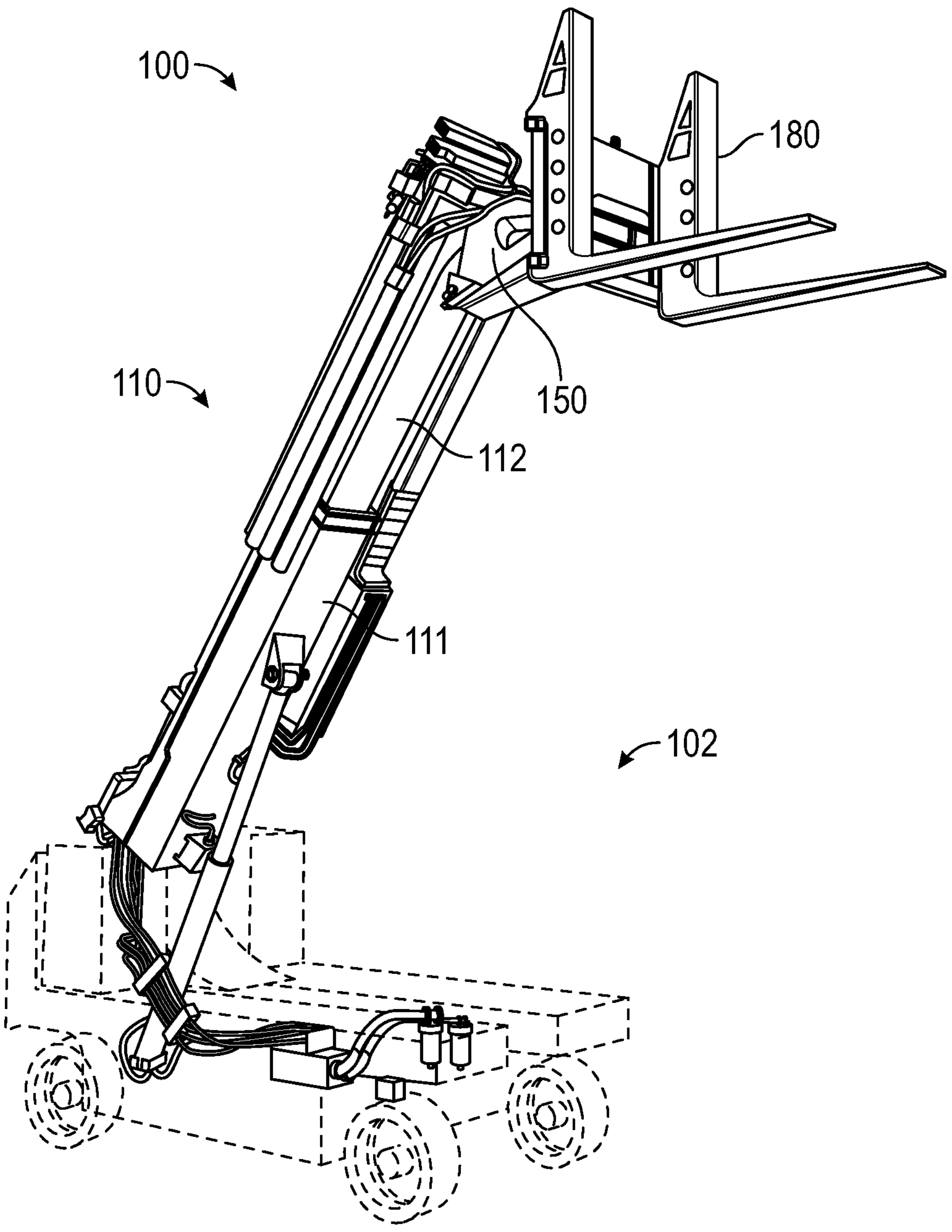
FIG. 3B is a perspective view of the boom system of FIG. 1 with the boom in a partially retracted configuration.
Figure 3C:
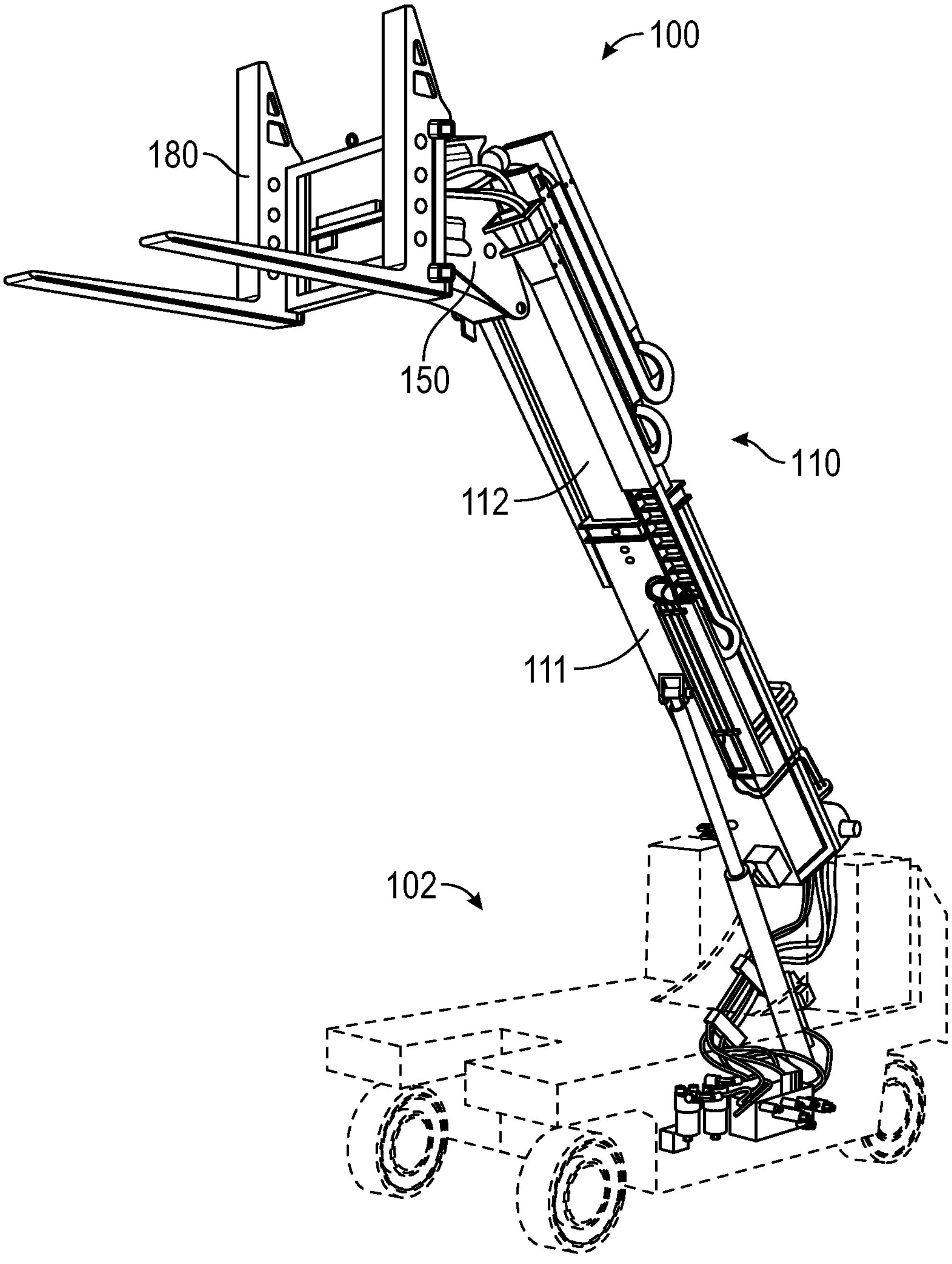
FIG. 3C is a perspective view of the boom system of FIG. 1 with the boom in a partially retracted configuration.

FIGS. 2 and 3A show the boom system 100 of FIG. 1 with all of the boom sections 112-115 in a fully retracted state and forklift forks 180 coupled to the attachment coupler assembly 150. As shown in FIG. 2, the actuators 122, 123, 124 are mounted only to the distal ends of their respective boom sections and are cantilevered such that they may overlap each more proximal boom section when retracted. FIGS. 3B and 3C show the boom system 100 of FIG. 1 with boom section 112 in a fully extended state and forklift forks 180 coupled to attachment coupler assembly 150.

Cradle Attachment

Figure 4:
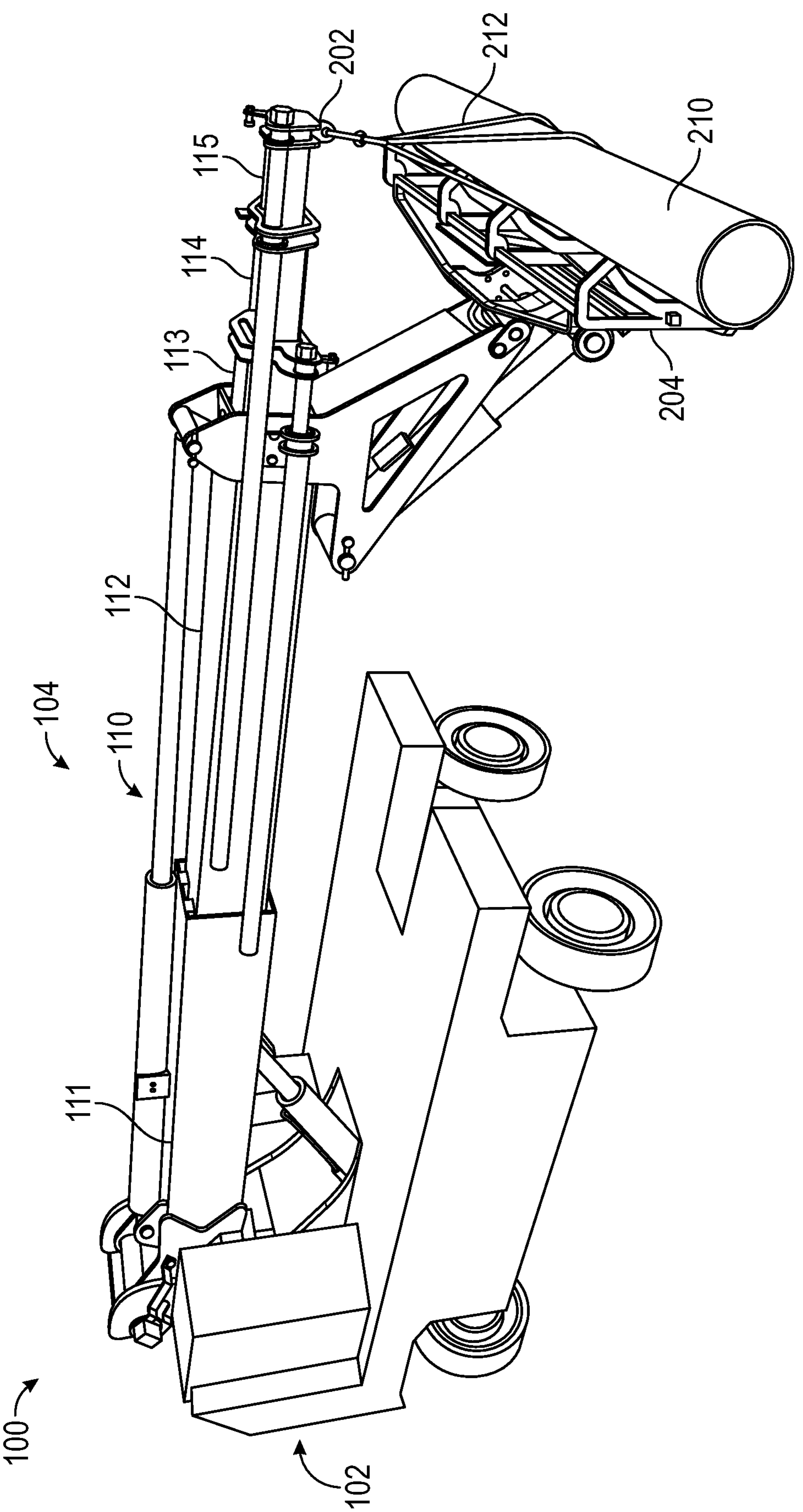
FIG. 4 is a perspective view of the of the boom system of FIG. 1 shown with a cradle attachment for stabilizing an elongated load.

Referring to FIG. 4, the boom system 100 is shown with a search hook 202 and a cradle attachment 204 (e.g., a cradle) for handling elongated loads. The cradle attachment 204 may be removably coupled to the coupler plate 154 of the attachment coupler assembly 150. The cradle attachment 204 is configured to assist in "pick-and-carry operations" to prevent a long or wide load suspended from the uppermost boom section, (e.g., suspended from the search hook 202) from rotating or swinging, or at least to restrict the rotation or swinging of the load. The cradle attachment 204 may partially support the load or may not support the load and may be used only to stabilize the load. The cradle may be configured to be coupled to a boom section other than the uppermost boom section. The cradle may be have a larger width than height, with the width being measured on a plane of rotation of the suspended elongated load and the height of cradle being measured perpendicular to the plane of rotation. The width may be generally along the elongated direction of the elongated load.

Referring still to the embodiment shown in FIG. 4, an example of the operation of the boom system 100 with the cradle attachment is as follows. A load 210, in the form of an elongated tube, is strapped using straps 212 while on a surface (e.g., the ground, a factory floor, etc.). The straps 212 are then coupled to the search hook 202. The search hook 202 is shown coupled to section 115 of the boom 110. The load may then be lifted off of the surface by extending the extendable portion 107 of the actuator 106 to lift the multifunctional boom assembly 104. In other embodiments, a retractable crane hook may be lowered from the end 148 of section 115 via a lifting rope and the load may be lifted by retracting the rope. When the load 210 is initially lifted, at least one of sections 113-115 may be partially extended such that the lift point is clear of the cradle attachment 204. After the load is lifted off of the surface, at least one of sections 113-115 can be retracted until the load 210 is received by the cradle attachment 204. The cradle attachment 204 can stop the load 210 from swinging and/or rotating while the boom system 100 moves the load 210 to another location.

In embodiments in which the cradle attachment 204 provides stability but does not support the load 210, the forces imparted on the cradle attachment 204 by the load may be very low, allowing the cradle attachment 204 to be very lightweight. For example, the cradle attachment 204 may be formed in a lattice structure. For example, the cradle attachment 204 may be light enough to be lifted by hand. The lightweight cradle attachment 204 may be more easily handled during installation to the attachment coupler assembly 150 and may improve the lifting capacity of the boom 110 compared to heavier attachments. The cradle attachment 204 may be foldable for storage. For example, the cradle attachment 204 may include a hinge at the center allowing the cradle attachment 204 to fold, reducing the width of the cradle attachment 204. In some embodiments, the cradle attachment 204 may include linkages allowing the cradle attachment 204 to fold into a significantly smaller overall size.

Boom Extension Sequencing

Figure 5:
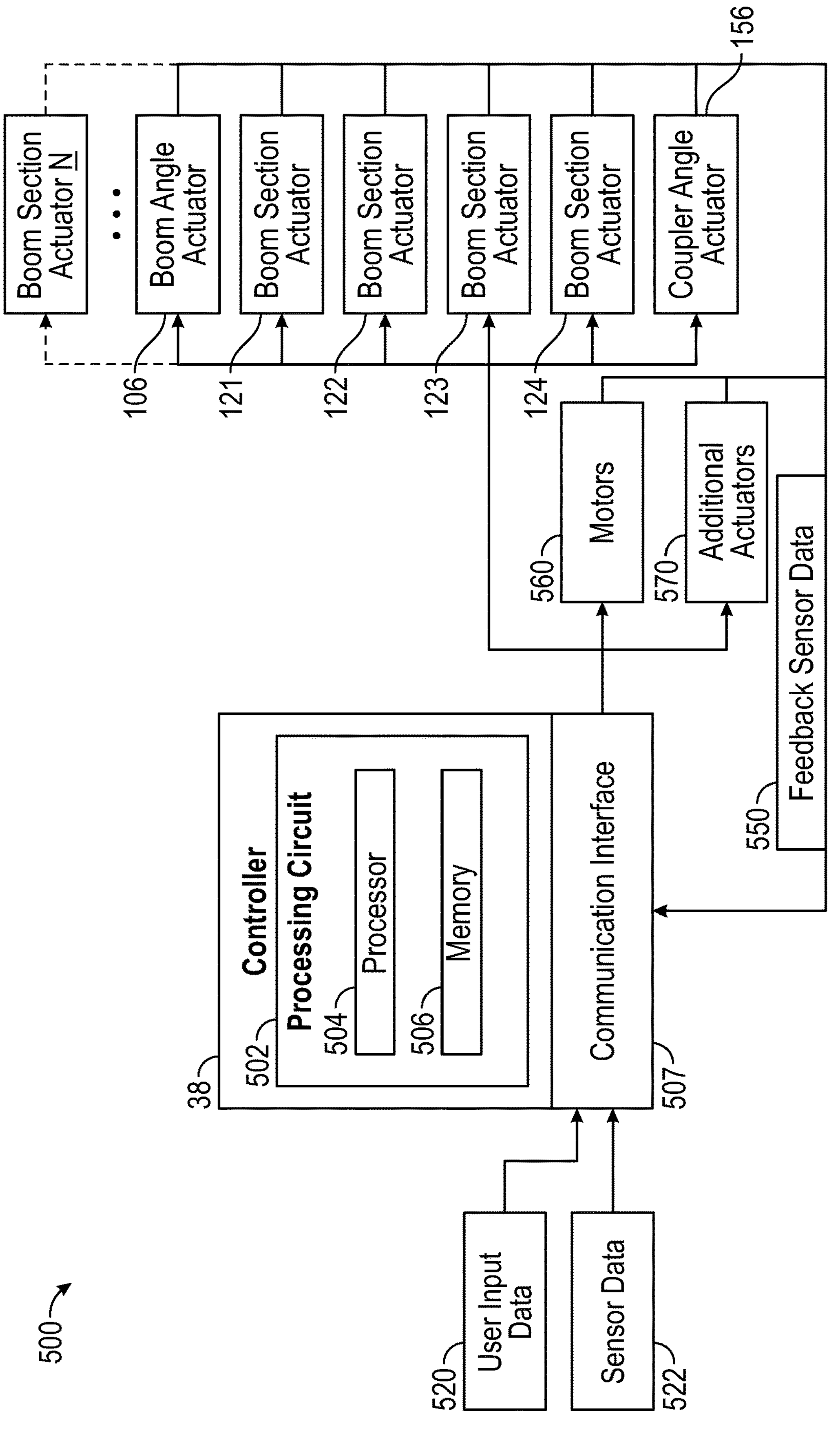
FIG. 5 is a schematic representation of a control system for a boom system, according to an exemplary embodiment.

Referring now to FIG. 5, a control system 500 for operating boom system 100 is shown, according to some embodiments. Control system 500 includes a controller 38 that can receive user input data 520 from a variety of human machine interfaces (e.g., steering wheel, drive and brake pedals, boom control levers, switches, computers etc.) and operate any of the controllable elements (e.g., motors, electromechanical actuators, hydraulic cylinders, etc.) of the boom system 100. For example, the controller 38 can receive inputs from a user causing the boom system 100 to drive forward, turn left or right, lift the boom 110, or extend the boom 110. The controller 38 then operates the motors and actuators by generating control signals and providing the control signals to the various controllable elements to perform requested operations. The controller 38 may also receive sensor data 522 and feedback sensor data 550 from sensors (e.g., proximity sensors, distance sensors, position sensors, weight sensors, etc.) operably coupled to the controller and may adjust the operation of the boom assembly based on the sensor data 522 and feedback sensor data 550. For example, the boom 110 may include weight sensors that determine the weight of a load lifted by the multifunctional boom assembly 104. The weight of the load may be transmitted to the controller 38. The controller 38 may then determine a maximum distance that the load can be extended from the base assembly 102 before the boom system 100 is at risk of tipping over. The controller 38 may then prevent the boom from lifting the load beyond the determined maximum distance. The controller 38 may also receive feedback sensor data 550 from any of the controllable elements. The feedback may include, for example, voltage or current indicative of a position (e.g., linear position, degree of extension, angular position, etc.) of any of the controllable elements, a speed (e.g., a speed of extension, a speed of rotation, etc.) of any of the controllable elements, etc. In some embodiments, the feedback is received from a sensor associated with each of the controllable elements. For example, a position sensor can be mounted to each of actuators 106, 121, 122, 123, 124, 156 to monitor an amount of extension or retraction. Controller 38 can use any of the sensor data 522 or feedback sensor data 550 to monitor operations of the boom system 100 and to generate control signals for the controllable elements.

Controller 38 can include a communications interface 507. Communications interface 507 may facilitate communications between controller 38 and external systems, devices, actuators, motors, sensors, etc. to allow user control, monitoring, and adjustment to any of the communicably connected external systems, devices, actuators, motors, sensors, etc. Communications interface 507 may also facilitate communications between controller 38 and the human machine interfaces (e.g., steering wheel, drive and brake pedals, boom control levers, switches, computers etc.).

Communications interface 507 can be or include wired or wireless communications interfaces (e.g., jacks, antennas, transmitters, receivers, transceivers, wire terminals, etc.) for conducting data communications with sensors, devices, systems, etc., of electric boom 10 or other external systems or devices (e.g., an administrative device). In various embodiments, communications via communications interface 507 can be direct (e.g., local wired or wireless communications) or via a communications network (e.g., a WAN, the Internet, a cellular network, etc.). For example, communications interface 507 can include an Ethernet card and port for sending and receiving data via an Ethernet-based communications link or network. In another example, the communications interface can include a Wi-Fi transceiver for communicating via a wireless communications network. In some embodiments, communications interface 507 is or includes a power line communications interface. In other embodiments, communications interface 507 is or includes an Ethernet interface, a USB interface, a serial communications interface, a parallel communications interface, etc.

Controller 38 includes a processing circuit 502 including a processor 504, and memory 506. Processing circuit 502 can be communicably connected to communications interface 507 such that processing circuit 502 and the various components thereof can send and receive data via communications interface 507. Processor 504 can be implemented as a general purpose processor, an application specific integrated circuit (ASIC), one or more field programmable gate arrays (FPGAs), a group of processing components, or other suitable electronic processing components.

Memory 506 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 506 can be or include volatile memory or non-volatile memory. Memory 506 can include database components, object code components, script components, or any other type of information structure for supporting the various activities and information structures described in the present application. According to some embodiments, memory 506 is communicably connected to processor 504 via processing circuit 502 and includes computer code for executing (e.g., by processing circuit 502 and/or processor 504) one or more processes described herein.

The controller 38 may be communicably coupled with and configured to control a plurality of linear actuators coupled to the boom. Referring to the embodiment of the boom system 100 shown in FIG. 1, the controller 38 may be configured to control each actuator 106, 121, 122, 123, 124, 156 independently by sending signals instructing the extendable portion of each actuator to extend out of or retract into the base portion. For example, the controller 38 may send signals to the valve assembly 161 instructing the valve assembly to open or close valves such that hydraulic fluid flows to or from the hydraulic cylinders, causing the pistons to extend or retract. Accordingly, each of sections 112-115 of the boom 110 can be extended or retracted independently and to different extents and the angle of the boom relative to a work surface can be increased or decreased by controlling actuator 106. In some embodiments the controller may be configured to extend the uppermost section of the boom (e.g., section 115 of boom system 100) only after each section other section is fully extended. This may maximize the lifting capacity of the lifting assembly when the boom is extended at lengths that are equal to or less than the length of the boom 110 when each of sections 112-114 are fully extended. It may also protect section 115 from excess bending forces, as section 115 may have the smallest cross section and lowest moment of inertia. In some embodiments, the each smaller section may remain fully retracted until the larger sections are fully extended. For example, as the boom 110 is extended from a fully retracted position to a fully extended position, sections 113-115 may remain fully retracted until section 112 is fully extended, sections 114-115 may remain fully retracted until section 113 is fully extended, and section 115 may remain fully retracted until section 114 is fully extended. In some embodiments, the boom may include more than five boom sections and the controller may be configured to control additional boom section actuators, e.g., boom section actuator N. In other embodiments the boom may include fewer than five boom sections and the controller may be configured to control fewer boom section actuators. The controller may also be configured to control motors 560 and additional actuators 570.

In some embodiments, an extension sequence of the hydraulic cylinders may be controlled by controller 38 such that a lateral distance between an implement connector (e.g., implement connector 170) at the end of the uppermost section of the boom (e.g., end 148 of section 115) and an attachment coupler assembly (e.g., attachment coupler assembly 150) is maximized. This may reduce the risk of a load hooked to the end 148 of section 115 from contacting the attachment coupler assembly 150 when the load is lifted or moved. For example, the actuators 121, 122, 123, 124 may be controlled such that actuators 122, 123, 124 extend sections 113, 114, and 115 before section 112 is extended. This moves the end 148 of section 115 farther from the attachment coupler assembly 150.

Figure 6A:
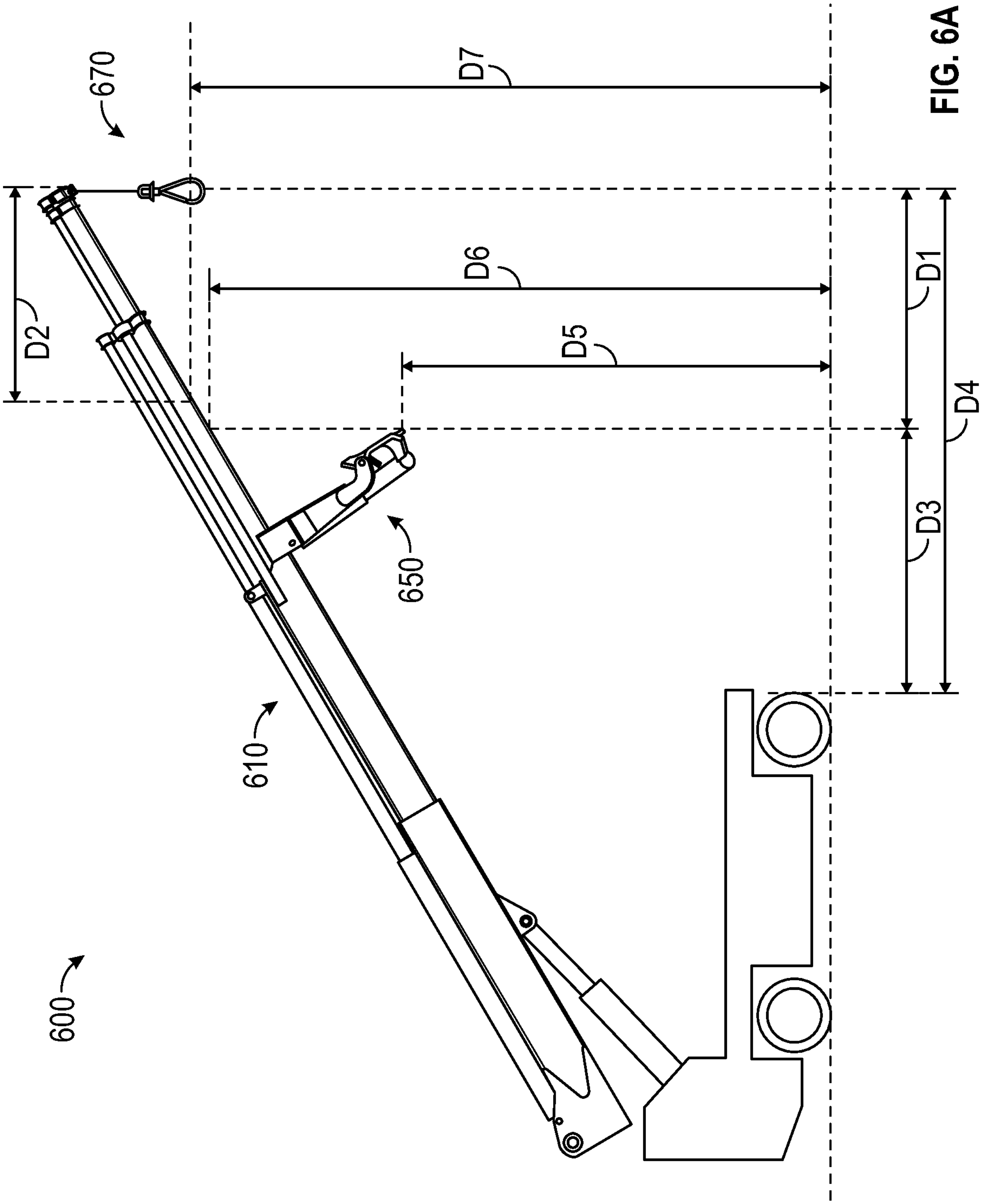
FIG. 6A is a side view of a boom system with a boom in an extended configuration according to an exemplary embodiment.

In other embodiments, the extension of the boom sections may be controlled such that a minimum lateral distance between the end of the uppermost section of the boom and the attachment coupler assembly (e.g., the distance between a vertical line passing through the implement connector and the attachment coupler assembly) is maintained. Referring now to FIG. 6A, a boom system 600 is shown according to an exemplary embodiment. One or more boom sections of the boom 610 that are distal to the attachment coupler assembly 650 may be extended to achieve the minimum lateral distance D1 between the implement connector 670 and the attachment coupler assembly 650. A lateral distance D2 between the implement connector 670 and the boom 610 itself may also be maintained. When the angle of the boom relative to the work surface is increased, the distal boom sections may have to be further extended to maintain the minimum lateral distance. When the angle of the boom relative to the work surface is decreased, the distal boom sections may be partially retracted while the minimum lateral distance is maintained. Once the minimum lateral distance is created, the boom section to which the attachment coupler assembly is coupled, and any boom sections proximal, can be extended. The controller may extend the most proximal boom sections before extending more distal boom sections, as long as the minimum lateral distance is maintained. This may maximize lifting capacity, as the more proximal boom sections may be larger and stronger than the more distal boom sections. As shown in FIG. 6A, D3 represents the distance from the attachment coupler 650 and the front most portion of the base assembly 102. D4 represents the distance between the front most portion of the base assembly 102 and the implement connector 670. D5 represents the height of the attachment coupler 650 from the ground. D6 represents the height of the boom 610 from the ground for the portion of the boom 610 directly above the front most portion of the attachment coupler 650. D7 represents the height of the implement connector 670 from the ground.

Figure 6B:
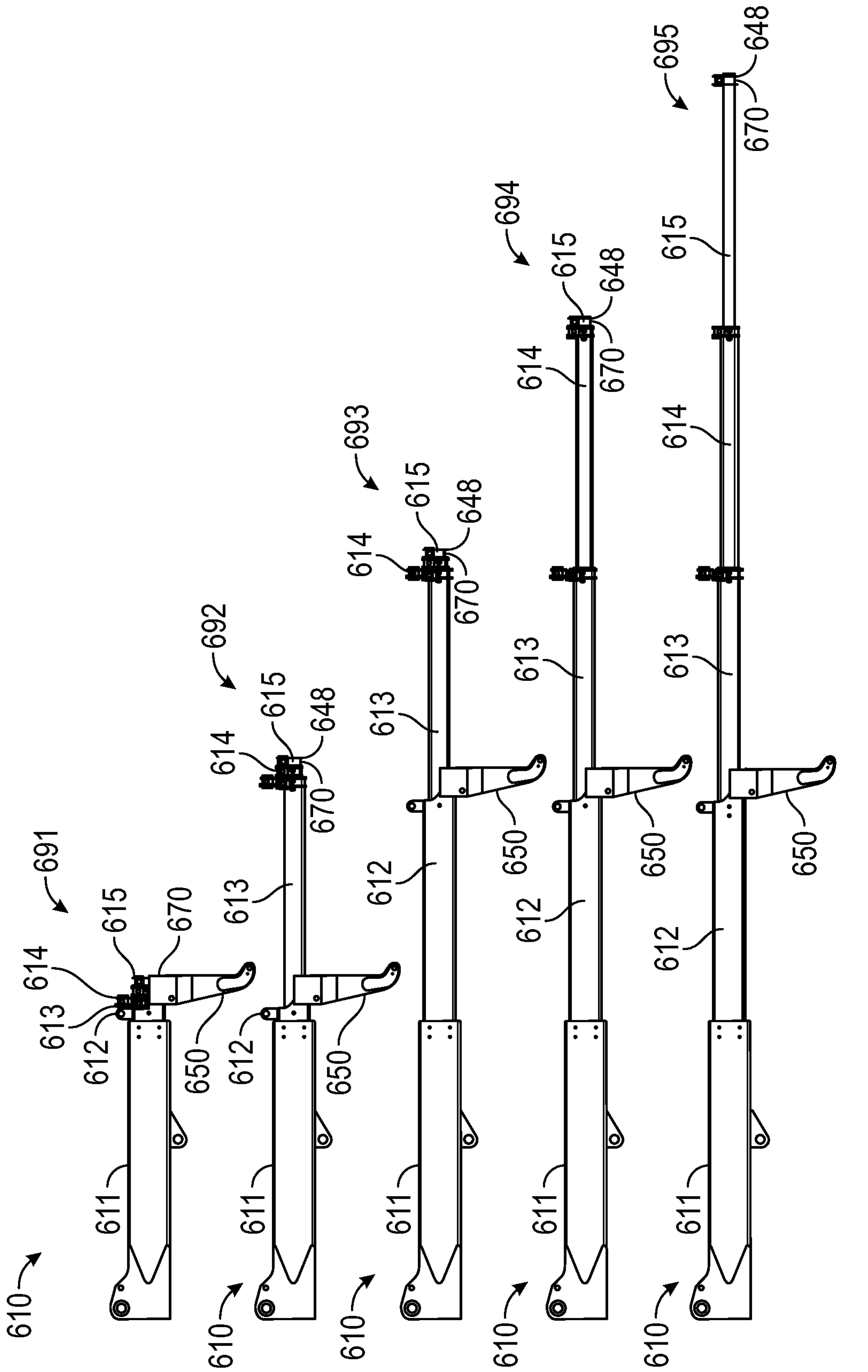
FIG. 6B is an extension sequence of the boom sections of the boom of the boom system of FIG. 6A.
Figure 7A:
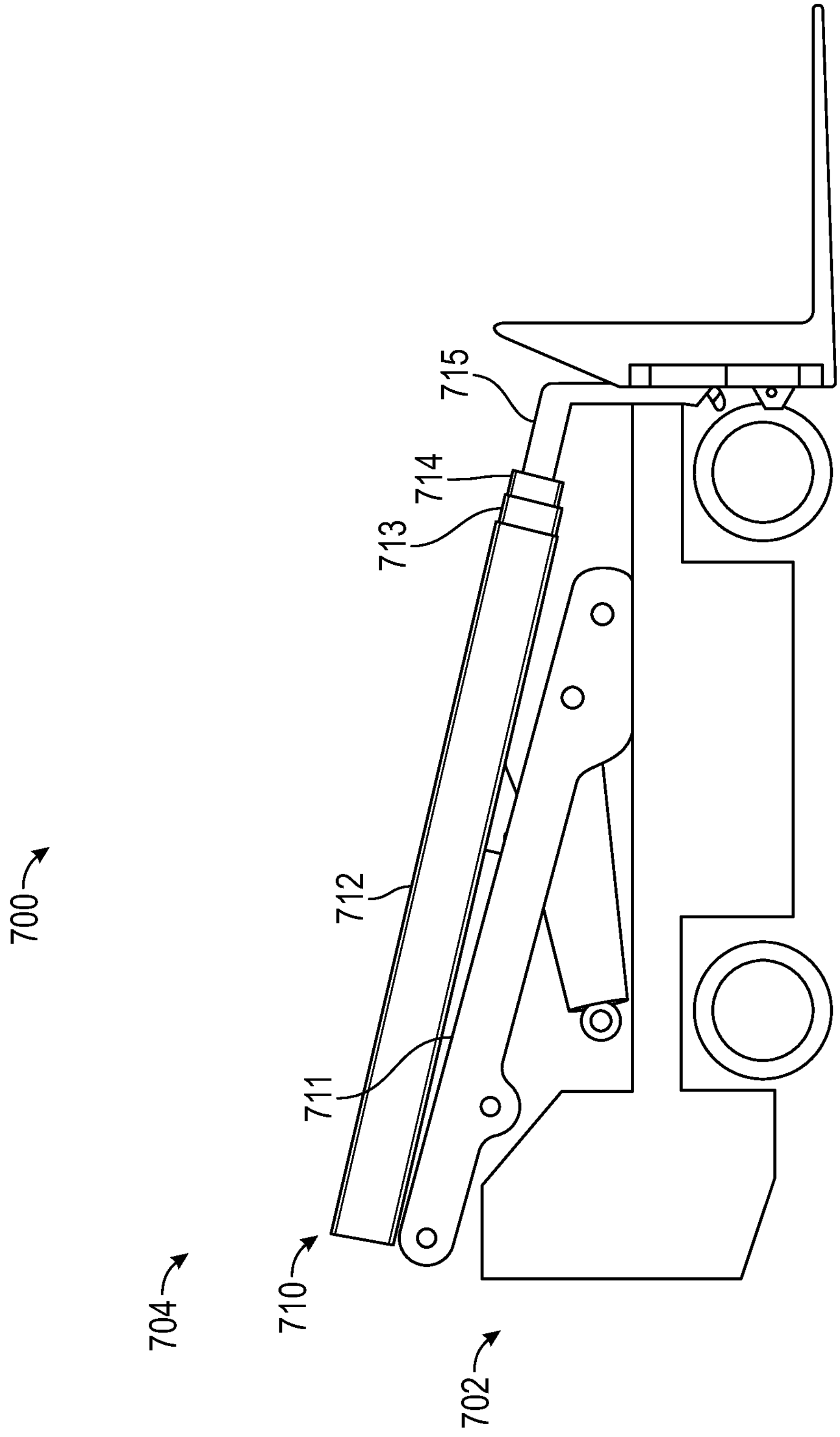
FIGS. 7A-7D show a side view of a boom system with a boom in various configurations according to an exemplary embodiment.
Figure 7B:
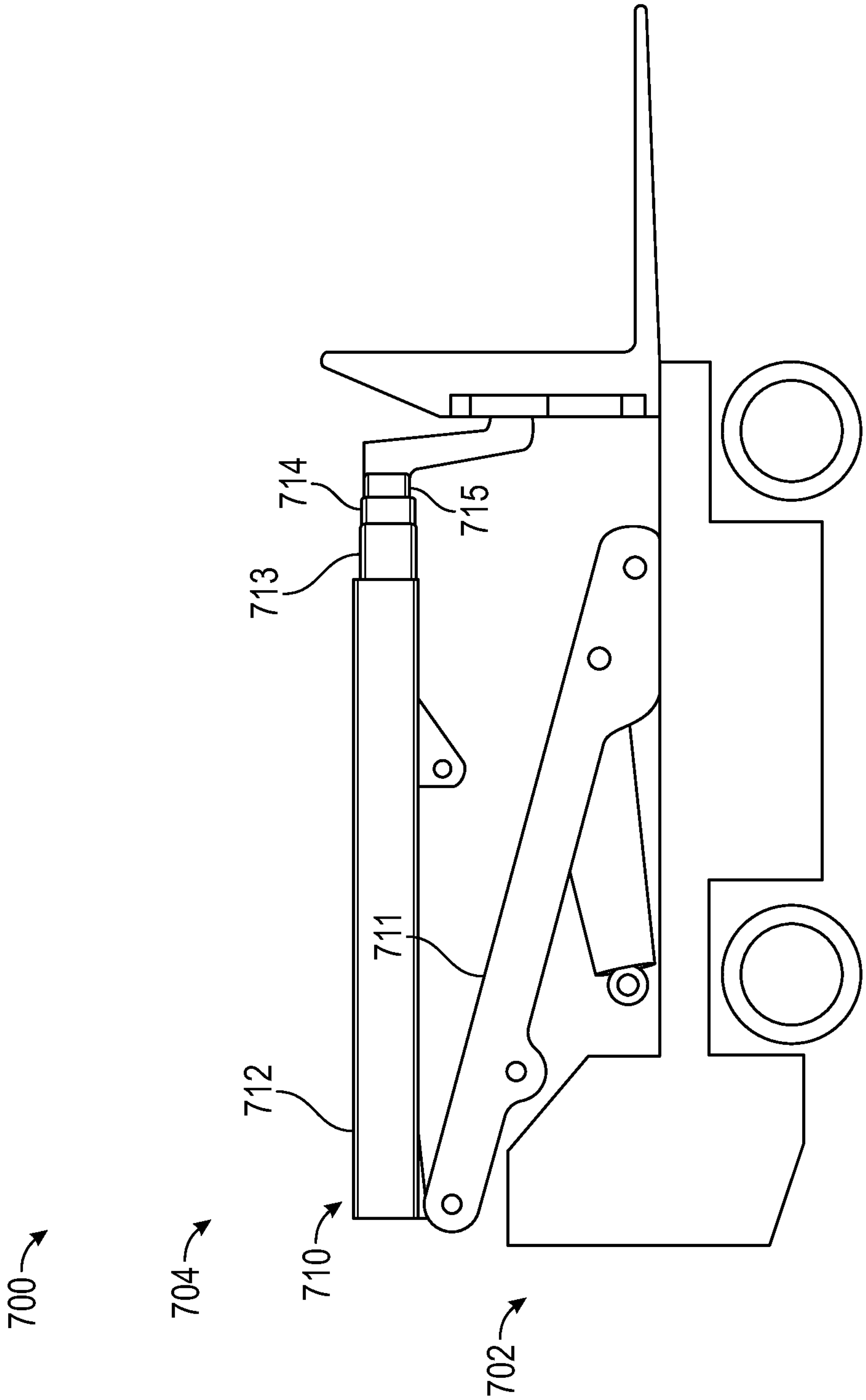
Figure 7C:
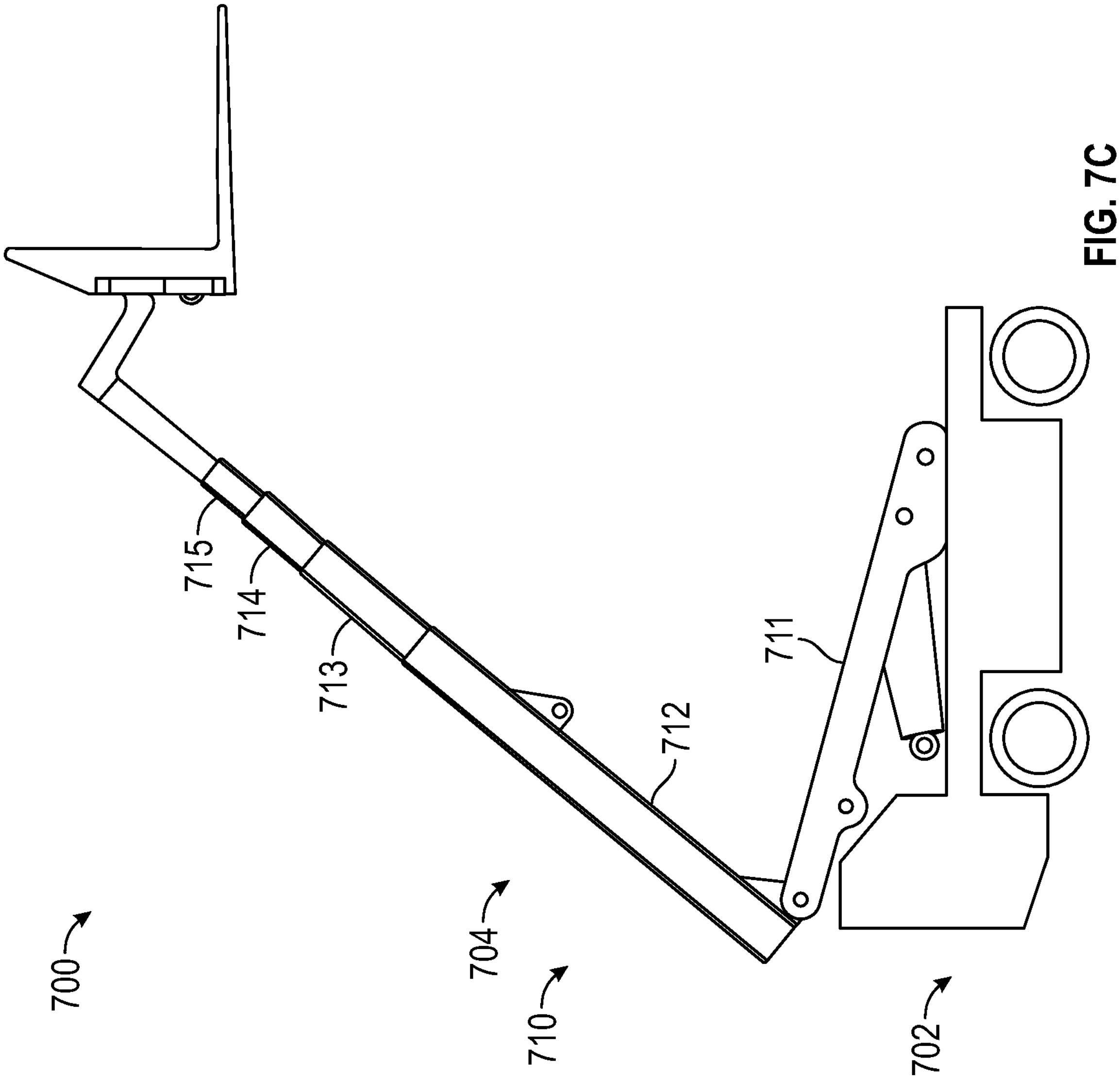
Figure 7D:
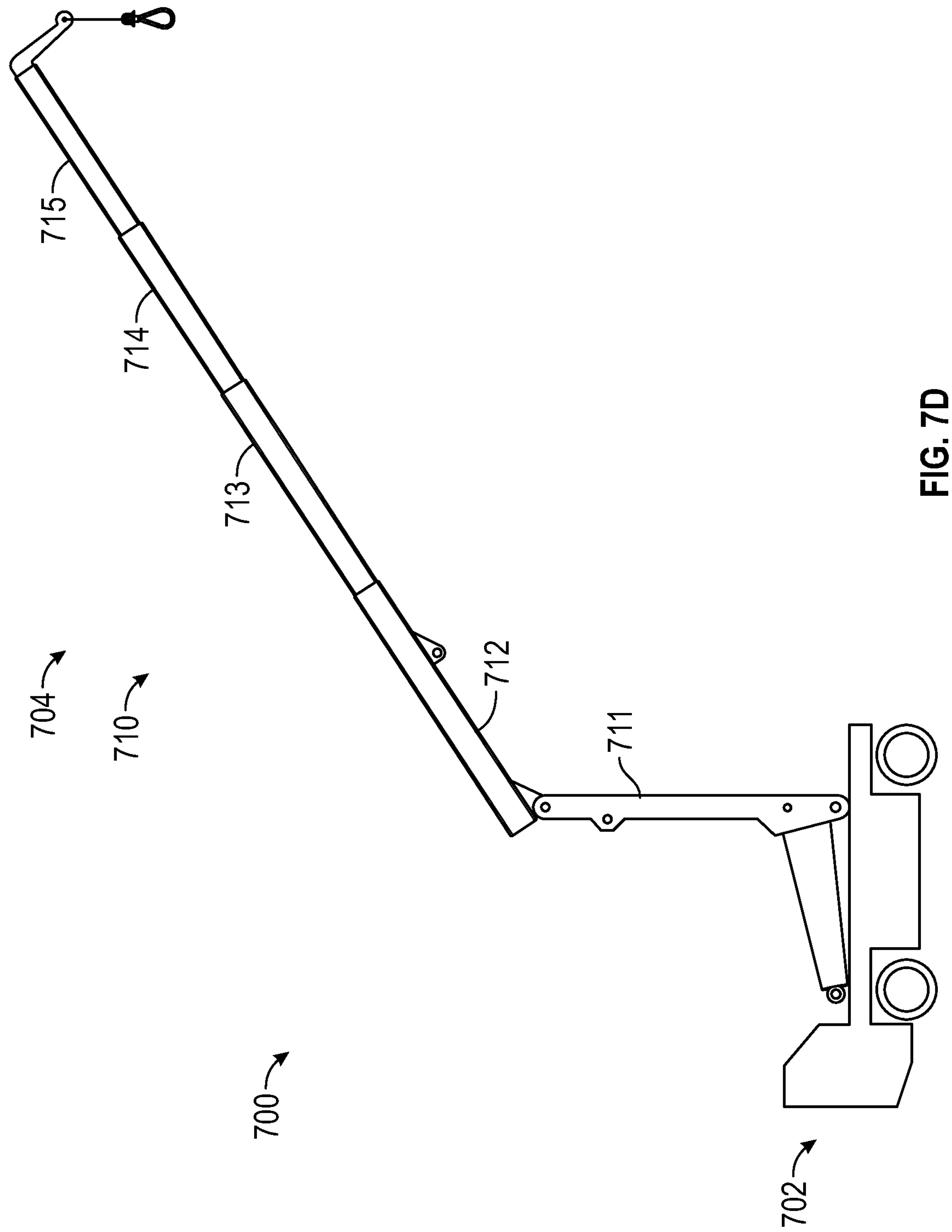

For example, referring to FIG. 6B, an extension sequence 690 of the boom 610 of boom system 600 is shown. At step 691 of the extension sequence, all of the boom sections 612-615 are retracted into boom section 611. At step 692, section 613 may be fully extended while sections 612, 614, 615 remain fully retracted, creating a safe working distance (e.g., a minimum lateral distance) between a load hooked to the implement connector 670 (not shown) at the end 648 of section 615 and the attachment coupler assembly 650. At step 693, sections 612, 613 may be extended while sections 614, 615 remain fully retracted. At step 694, sections 612, 613, 614 may be extended while section 615 remains fully retracted. At step 695, sections 612, 613, 614, 615 may be fully extended. Thus, the controller 38 may control the hydraulic cylinders such that the most proximal section that is distal to the attachment coupler assembly is extended first, followed by the next most proximal section that is distal to the attachment coupler assembly, etc., until the minimum lateral distance is achieved. Once the minimum lateral distance is achieved, the controller may control the hydraulic cylinders such that the overall most proximal extendable boom section extends next, followed by the next most proximal section, etc. This may maximize the lifting capacity of the multifunctional boom assembly 104 while maintaining the minimum lateral distance safe distance between the load and the attachment coupler assembly.

The controller 38 may calculate the minimum lateral distance and determine the extension sequence of the sections of the boom based on various sensor data 522 and user input data 520. For example, the controller 38 may receive weight sensor data indicating the weight of the load and may receive user input data indicating the radius of the load and the distance between the top of the load and the implement coupled to the implement connector 170 (e.g., to account for the length of any lifting straps or ropes in determining the height of the load). The controller 38 may determine the extension sequence depending on the weight and radius, as well as the angle of the boom 110 and the extension of the boom 110. For example, for a heavier load with a smaller radius, section 113 may be extended first to create a safe distance between the load and the attachment coupler assembly 150. Then section 112 can be extended such that the lifting capacity is maximized. For a lighter load with a larger radius, section 113-115 may be extended before section 112 is extended to maximize the distance between the load and the attachment coupler assembly. It should be understood that the "radius" of the load refers to the maximum horizontal distance from the furthest edge of the load to the vertical axis of the lifting hook. In some cases, rotation of the load may be prevented (e.g., using a tagline) and the horizontal distance between the edge of the load and the vertical axis of the lifting hook in the direction of the attachment coupler assembly may be used instead of the overall load radius.

Additional Kinematic Embodiments

Figure 8:
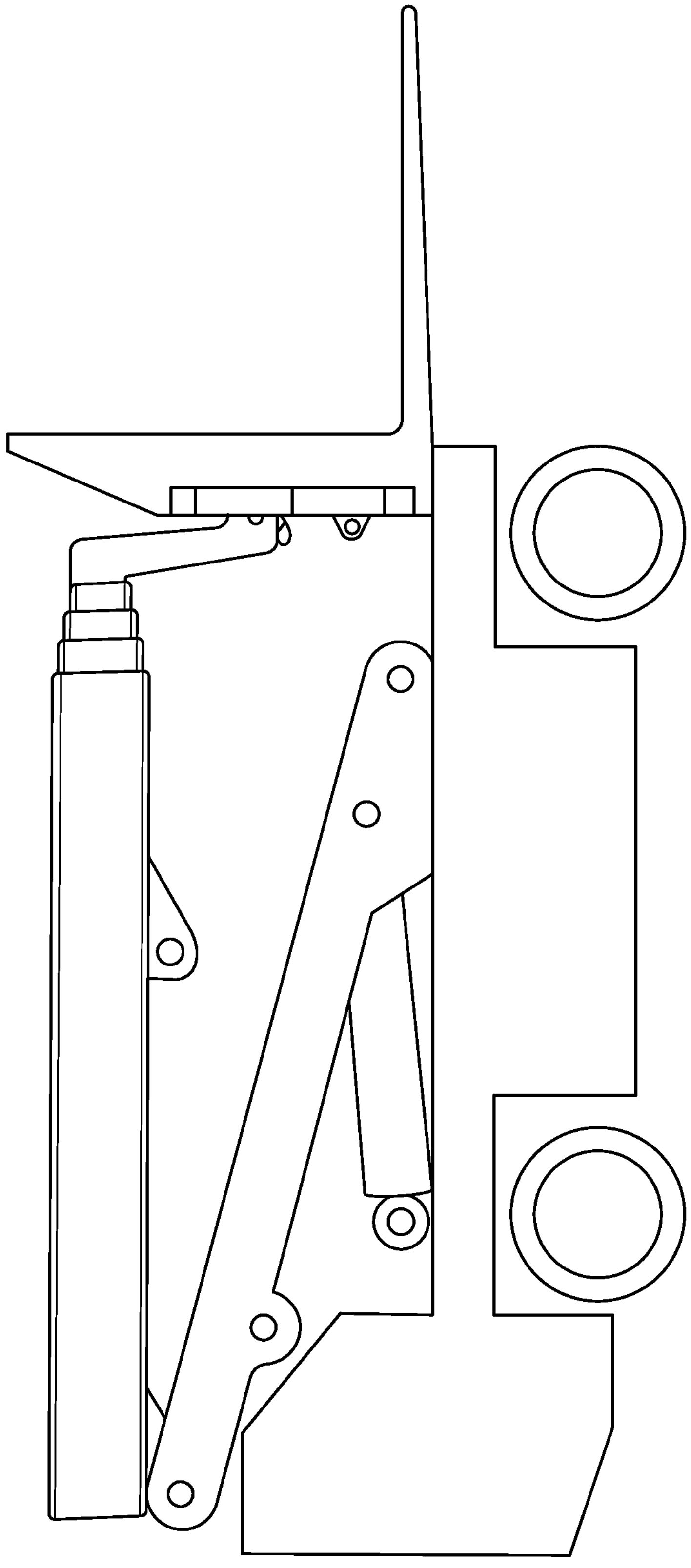
Figure 9A:
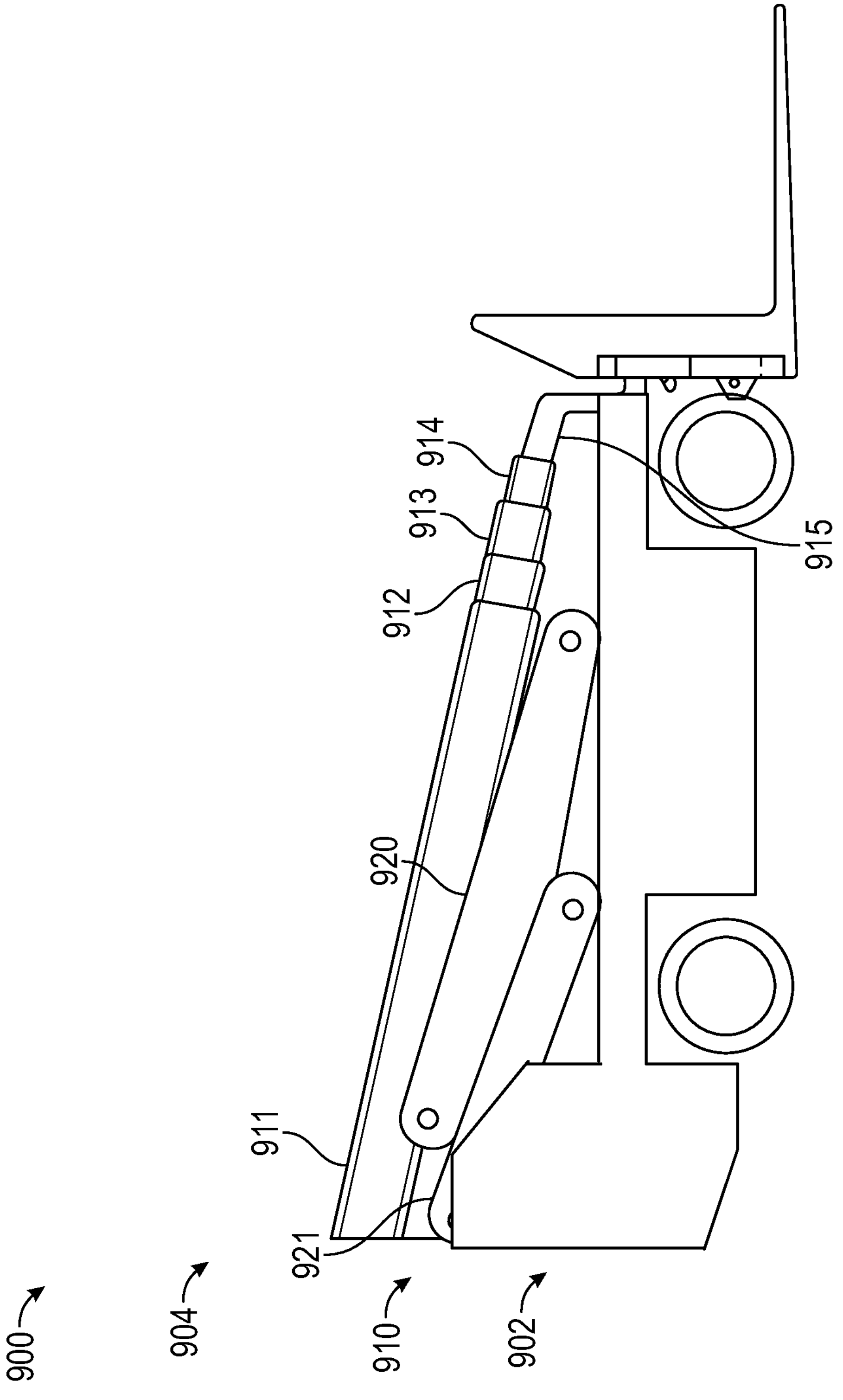
FIGS. 9A-9D show a side view of a boom system in various configurations according to an exemplary embodiment.
Figure 9B:
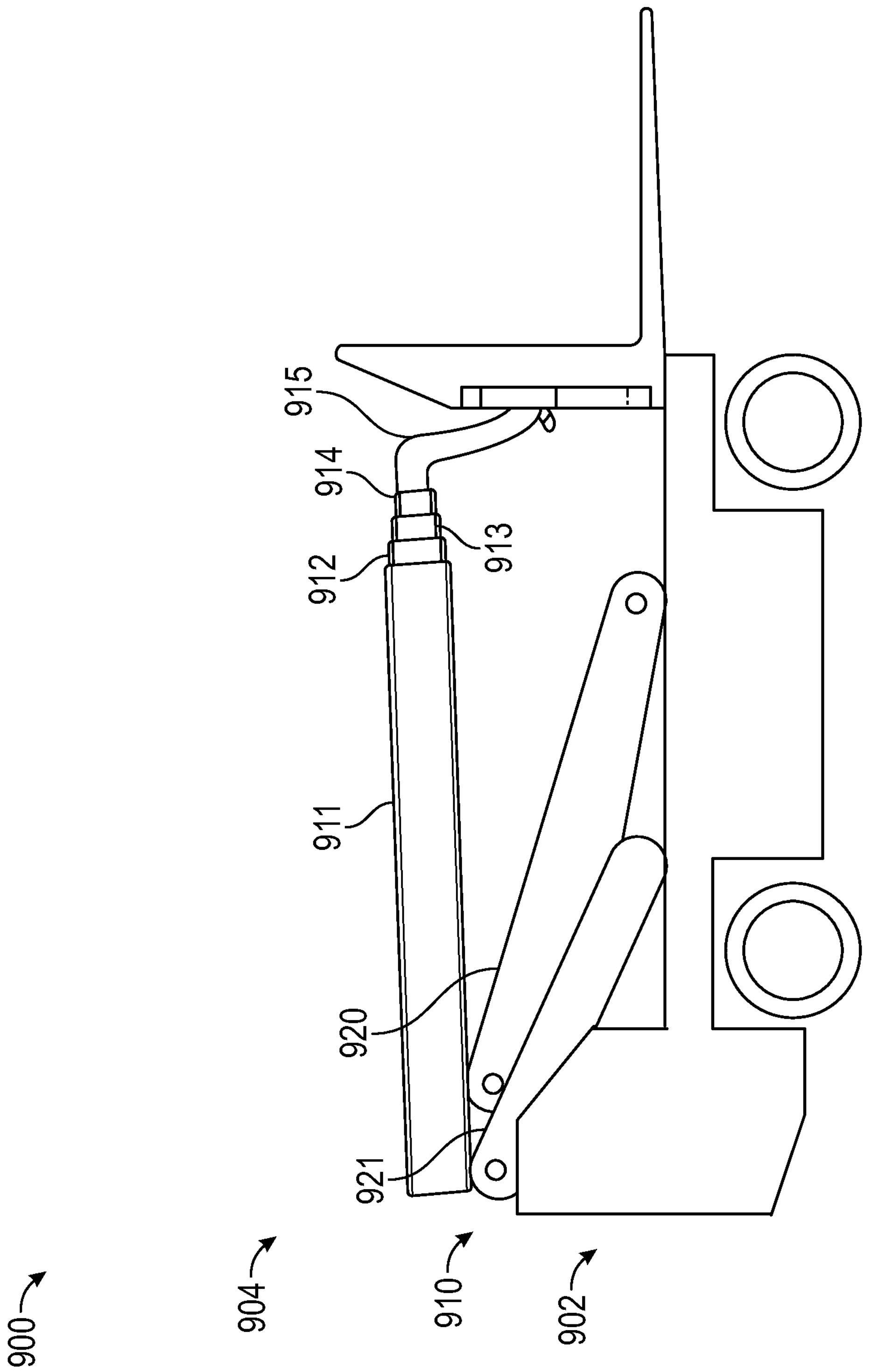
Figure 9C:
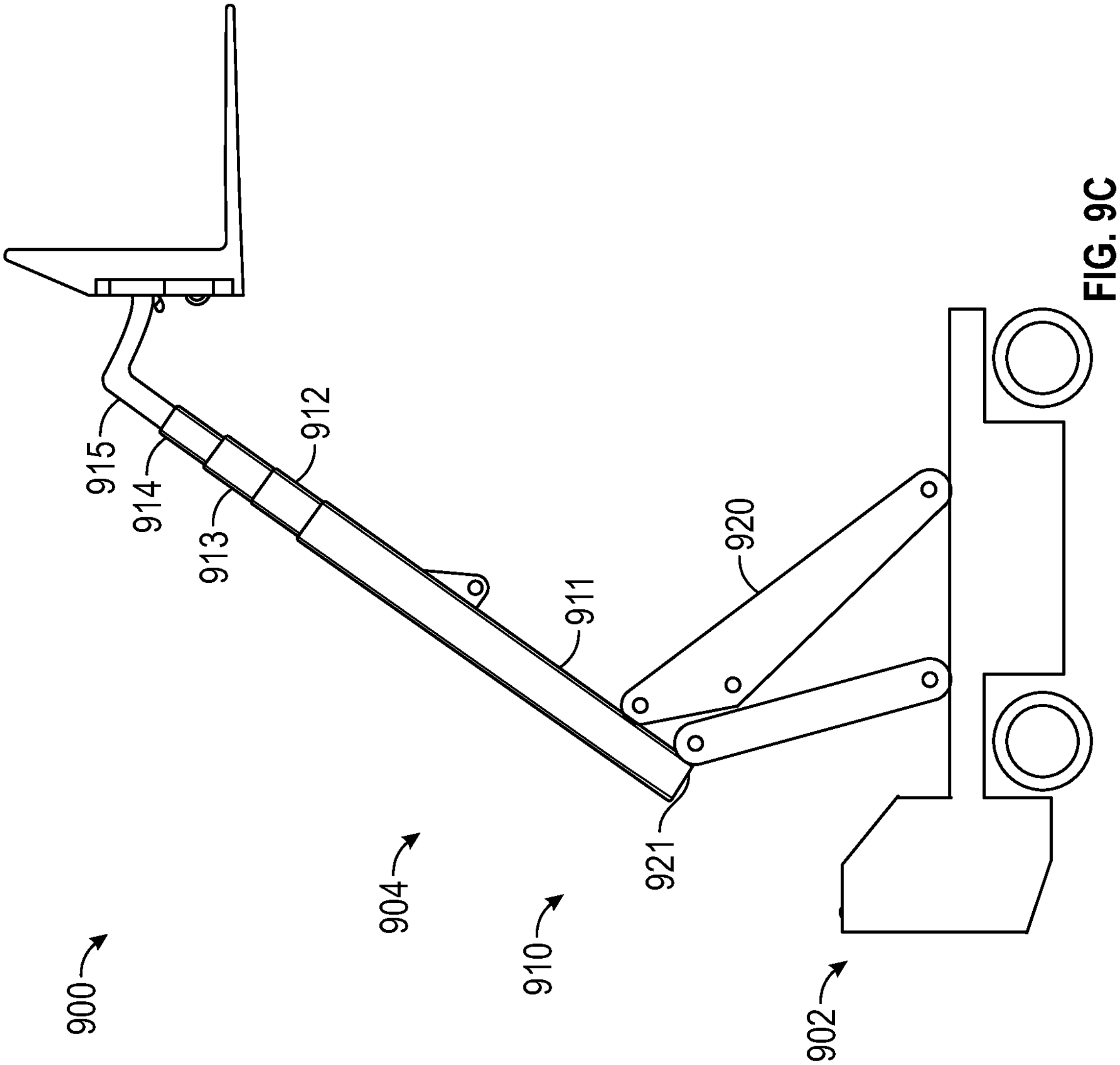
Figure 9D:
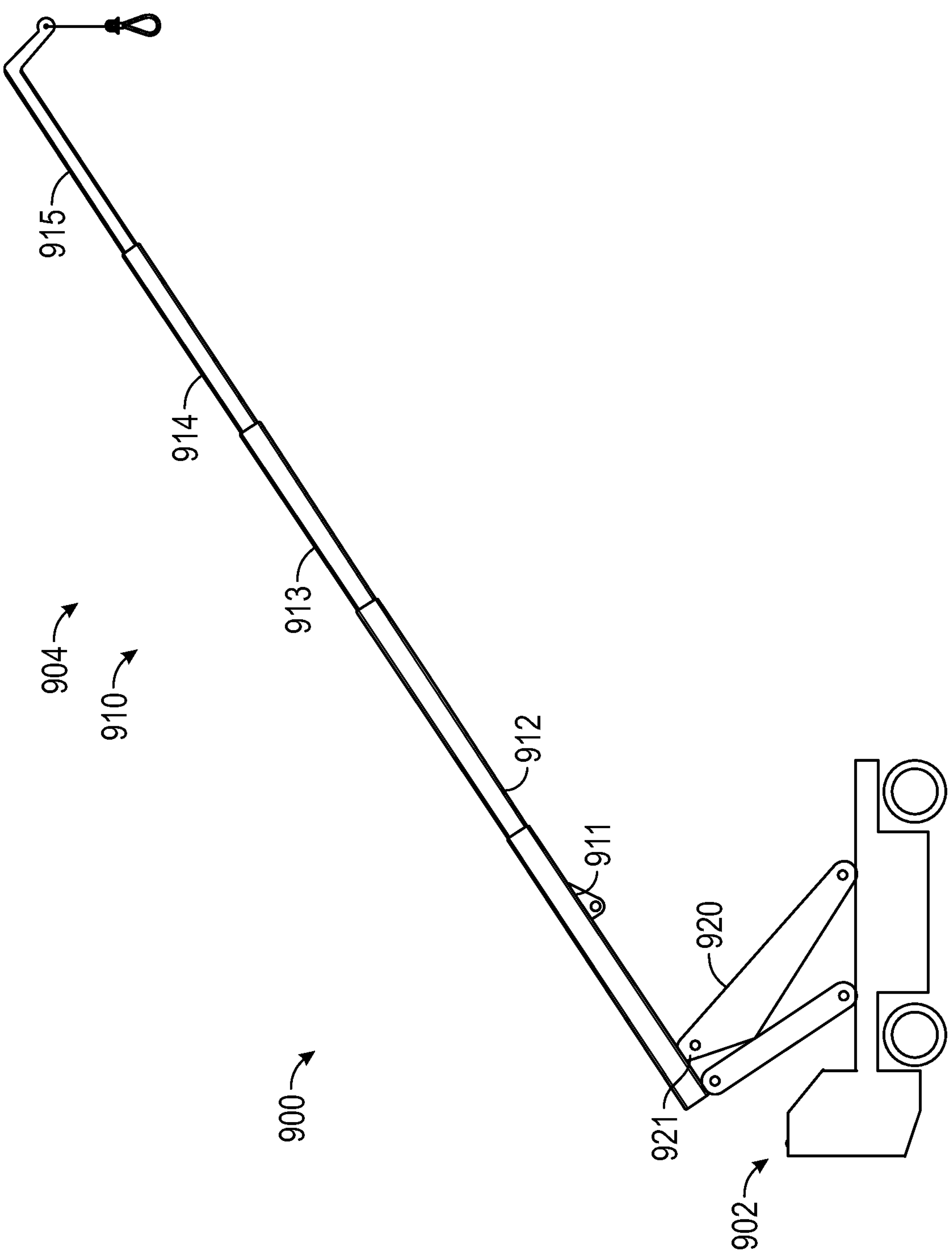

FIGS. 7A-13 show various exemplary embodiments of a boom system that may function similarly to the boom systems 100, 600 described above. FIGS. 7A-7D show a boom system 700 in multiple orientations according to an exemplary embodiment. Boom system 700 includes a base 702 and a multifunctional boom assembly 704. The multifunctional boom assembly includes a boom 710 with boom sections 711-715. As shown in FIGS. 7A-7D, either a lifting hook or forklift forks may be coupled to the distal end of boom section 715. In other embodiments, the boom system 700 may allow the forklift forks, a cradle attachment, or another implement to be coupled to one of boom sections 712-714. Boom section 711 may be configured as a tower lift to raise the height of the other boom section 712-715. In some embodiments, boom section 711 may be raised to a vertical position when a crane hook is used in order to increase the vertical range of the boom system 700. Boom section 711 may be lowered to a lower position when the forklift forks are used for higher weight loads. The angle of the boom sections 712-715 relative to boom section 711 may be controlled by a linear actuator (e.g., a hydraulic cylinder, an electromechanical actuator, etc.) coupled to boom section 711 with its piston coupled to boom section 712. FIG. 8 shows the boom system 700 of FIGS. 7A-7D in a fully retracted and lowered position.

Figure 10:
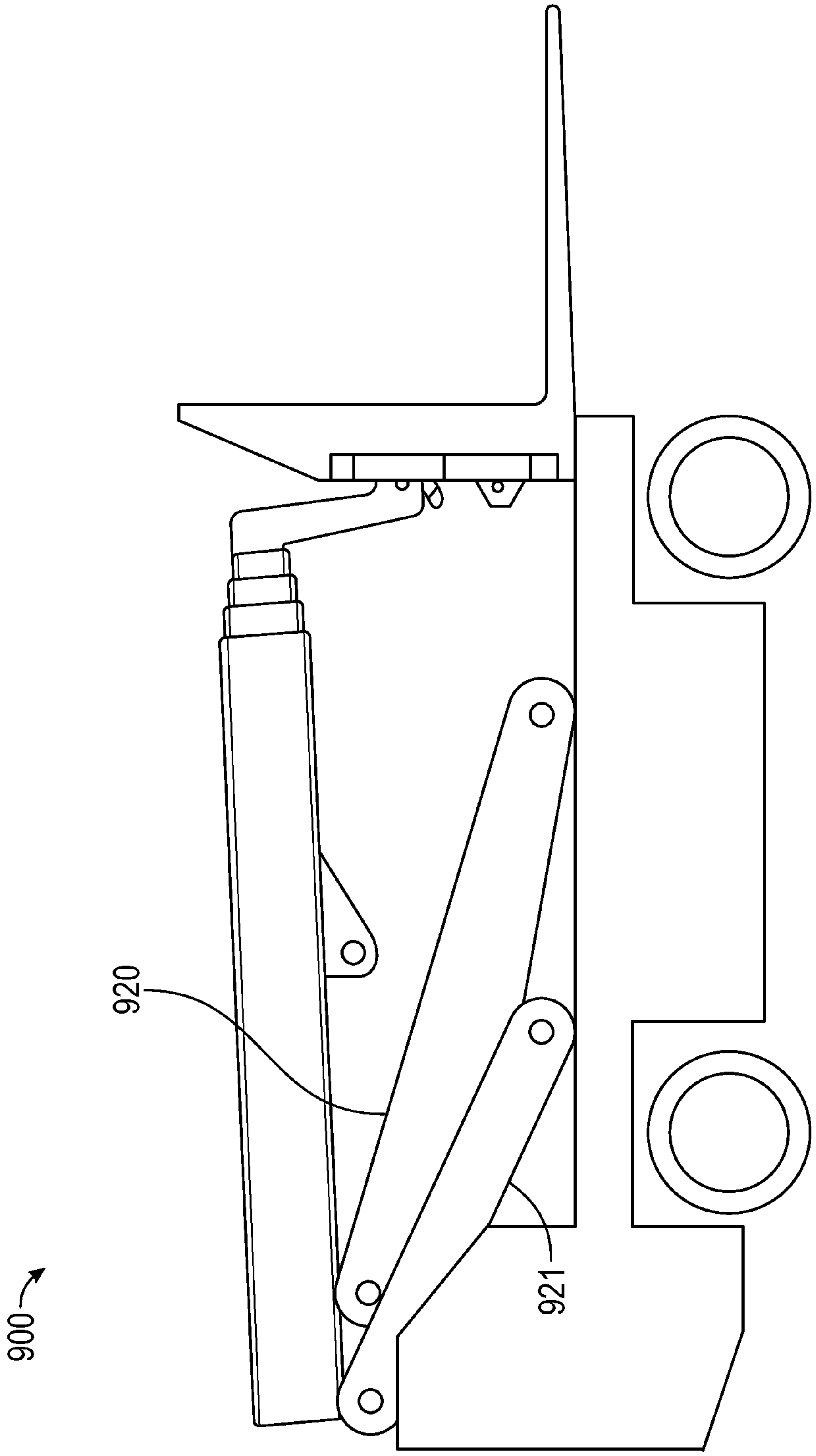
FIG. 10 is a side view of the boom system of claim 9 with the boom in a retracted configuration

FIGS. 9A-9D show a boom system 900 in multiple orientations according to an exemplary embodiment. Boom system 900 includes a base 902 and a multifunctional boom assembly 904. The multifunctional boom assembly 904 includes a boom 910 with boom sections 911-915. As shown in FIGS. 9A-9D, either a lifting hook or forklift forks may be coupled to the distal end of boom section 915. In other embodiments, the boom system 900 may allow the forklift forks, a cradle attachment, or another implement to be coupled to one of boom sections 911-914. Additional linkages 920, 921 may be used to raise the boom proximal end of the boom 910. FIG. 10 shows the boom system 900 of FIGS. 9A-9D in a fully retracted and lowered position.

Figure 11:
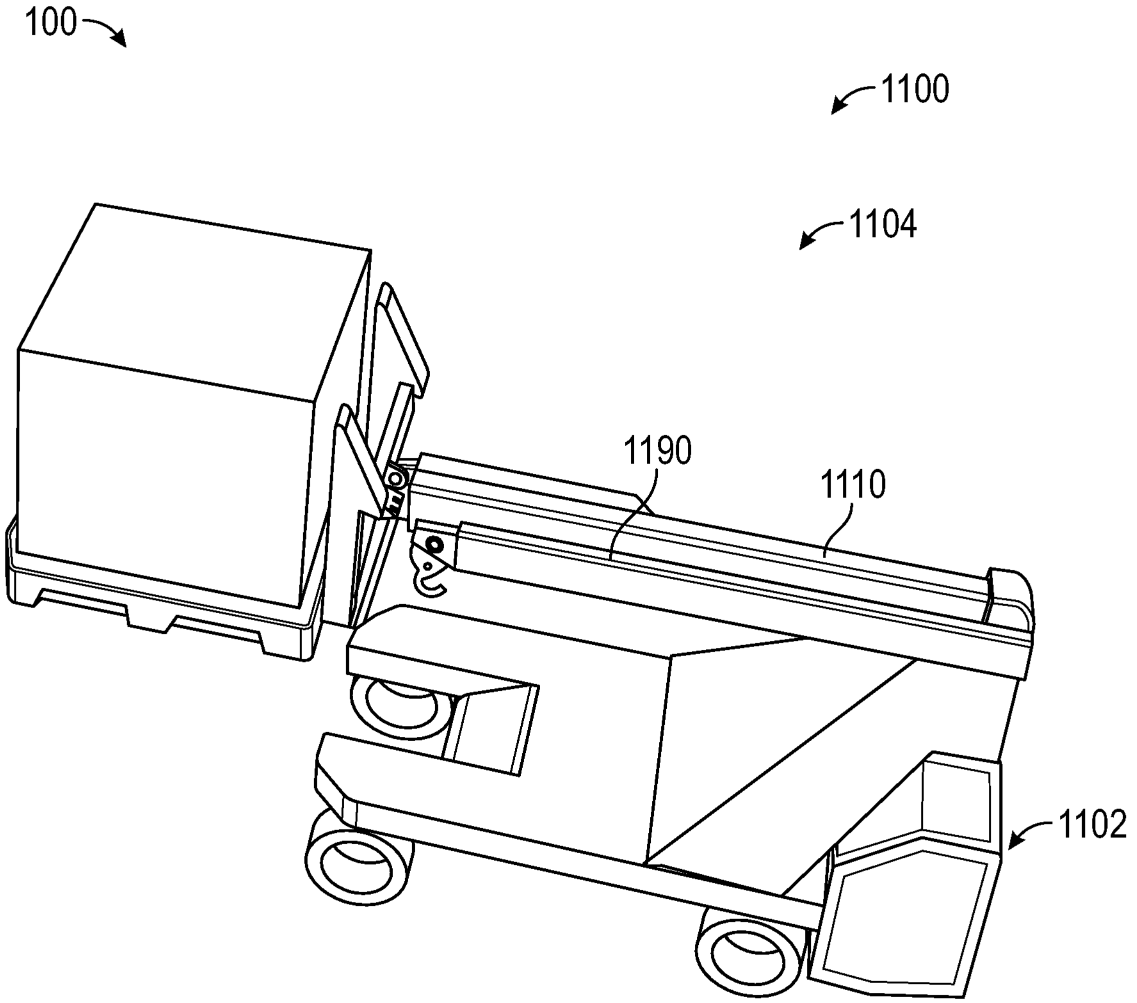
FIG. 11 is a perspective view of a boom system with a primary boom and a secondary boom each in a retracted configuration, according to an exemplary embodiment.
Figure 12:
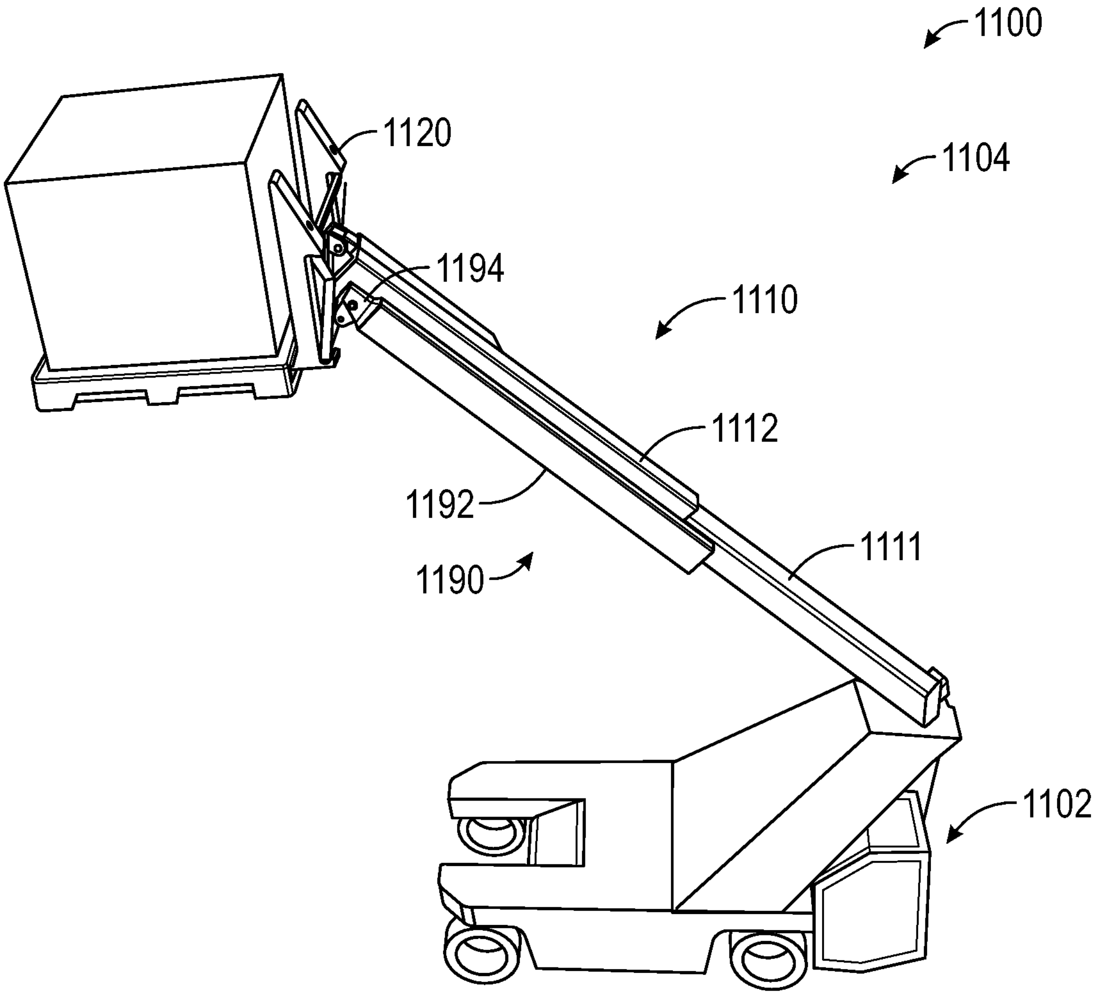
FIG. 12 is a perspective view of the boom system of FIG. 11, with the primary boom in an extended configuration and the secondary boom in a retracted configuration.
Figure 13:
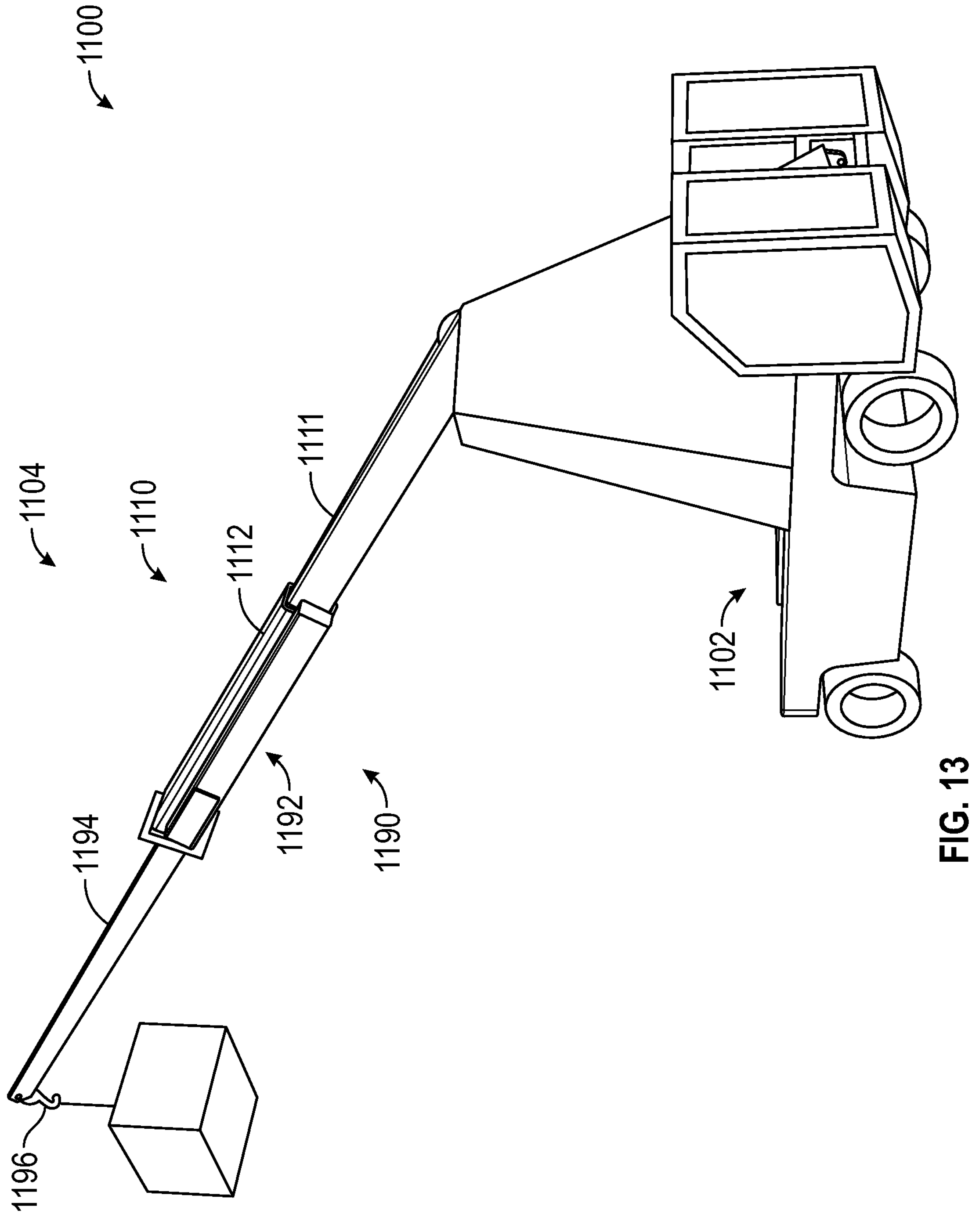
FIG. 13 is a perspective view of the boom system of FIG. 11, with the primary boom and the secondary boom each in an extended configuration.

FIGS. 11-13 show a boom system 1100 that includes a base assembly 1102 and a multifunctional boom assembly 1104, according to an exemplary embodiment. The multifunctional boom assembly includes a primary boom 1110 including two boom sections 1111, 1112 and a secondary boom 1190 mounted to boom section 1112. In various embodiments, the secondary boom may be installed on either side, on top, or on bottom of the primary boom 1110. The primary boom may be in a reverse-telescope orientation, such that when section 1112 is retracted, section 1111 is nested within section 1112. This allows for the attachment of the secondary boom to the outside of section 1112 without interfering with the telescoping mechanics. A first implement 1120 (e.g., forklift forks) may be coupled to the end 1115 of boom section 1112 and may be used for heavier loads that require less range of motion and other palletized loads. The secondary boom 1190 may include a housing 1192 and at least one extendable section 1194 to which a second implement 1196 (e.g., a crane hook) may be coupled. The extendable section 1194 may nest inside the housing 1192 when the first implement is in use. As shown in FIG. 13, when a lighter load must be lifted with a larger range of motion is required, the extendable section 1194 may extend from the housing 1192 and combined primary boom 1110 and secondary boom 1190 may be used as a crane.

Figure 14:
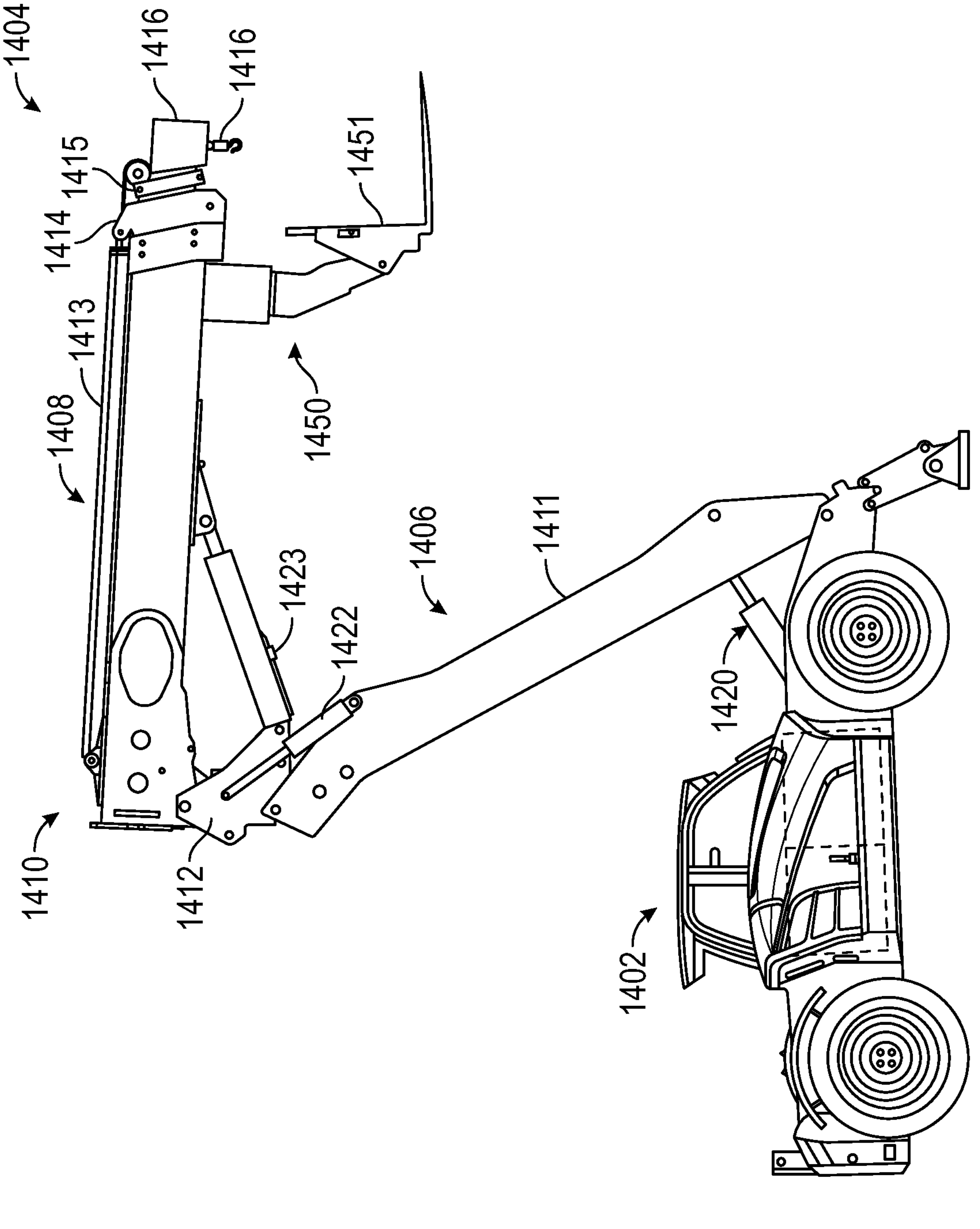
FIG. 14 is a side view of a boom system with a boom in an extended configuration according to an exemplary embodiment.

FIG. 14 shows a boom system 1400 that includes a base assembly 1402 and a multifunctional boom assembly 1404 according to another exemplary embodiment. The multifunctional boom assembly 1404 includes an articulated boom 1410 that includes a tower boom 1406 coupled to an extendable boom 1408. The tower boom 1406 includes a first boom section 1411 that articulates over the base assembly 1402 and a second boom section 1412 that helps enable the rotation of the extendable boom 1408 relative to the tower boom 1406. A linear actuator 1420 is configured to control the angle of the tower boom 1406 relative to the base assembly 1402. The extendable boom 1408 includes four boom sections 1413-1416. Boom sections 1414-1416 telescopically extend and retract from boom section 1413, similarly to boom 110 described above, with boom section 1416 defining the distal end of the extendable boom 1408. Boom section 1413 is coupled to the tower boom 1406. Boom section 1413 is also coupled to an attachment coupler assembly 1450, which is configured to receive an implement, such as fork lift forks 1451. In some embodiments, the attachment coupler assembly 1450 may be coupled to another intermediate boom section (e.g., boom sections 1414, 1415) Boom section 1416 may include an implement connector 1470 (e.g., a lifting ring, hook, or search hook) configured to receive a lifting implement. Similar to the boom system 100 described above, the forklift forks 1451 may be used to lift heavier loads closer to the base assembly 1402.

Linear actuators 1422 and 1423 are configured to control the angle of the extendable boom 1408 relative to the first boom section 1411 of the tower boom 1406. There may also be an additional linear actuator on the opposite side of the boom 1410 that is identical to linear actuator 1422. When the tower boom 1406 is angled back over the base assembly 1402, the forklift forks 1451 can be used to lift a load off of the ground. Rotating the tower boom 1406 away from the base assembly 1402 elevates the telescoping assembly, facilitating a higher reach with the forklift forks 1451 without additional telescoping sections being added to the extendable boom 1408. When the extendable boom is used, a load may be coupled to the implement connector 1470 and the extendable boom 1408 can extend to reach higher, farther areas from the base assembly 1402. When the tower boom 1408 is raised, the elevated position of the extendable boom 1408 allows the boom system 1400 to be positioned closer to an obstacle, such as a wall or a shipping container, and to lift loads up and over the obstacle. The tower boom 1406 can move the implement connector 1470 primarily upward and the extendable boom 1408 can move the implement connector 1470 primarily horizontally out over the obstacle. Other articulated boom arrangements known in the art of telehandlers, boom lifts, and cranes may be adapted to include an extendable boom portion at a distal end of the boom. An attachment coupler assembly may be positioned at an intermediate section of the boom, and an implement connector may be positioned at the distal end of the extendable boom portion.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the applications as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A boom system comprising:

a base assembly;

a boom assembly comprising:

a boom including a plurality of boom sections, the plurality of boom sections including:

a lower boom section coupled to and extending away from the base assembly and defining a proximal end of the boom, and an upper boom section defining a distal end of the boom;

a first implement coupled to one of the plurality of boom sections, wherein the first implement is coupled to a boom section other than the upper boom section;

second implement positioned at the distal end of the boom, wherein the first implement and the second implement are configured to each support a common load; and a controller communicably coupled with the boom assembly, wherein the controller comprises one or more memory devices coupled to one or more processors, the one or more memory devices configured to store instructions thereon that, when executed by the one or more processors, cause the one or more processors to communicate with the boom assembly to control the plurality of boom sections such that a minimum distance between the first implement and the second implement is maintained.

2. The boom system of claim 1, wherein at least one of the plurality of boom sections is configured to extend and retract to increase and decrease a length of the boom.

3. The boom system of claim 2, wherein at least two of the plurality of boom sections are configured to extend and retract independently of each other.

4. The boom system of claim 3, further comprising a plurality of linear actuators, each comprising a base portion and an extendable portion configured to extend from the base portion, wherein the base portion of one of the linear actuators is coupled to each of the boom sections other than the upper boom section and the respective extendable portion is coupled to an adjacent boom section, the extension of the extendable portion from the base portion causing the adjacent boom section to extend in the direction of the distal end of the boom.

5. The boom system of claim 4, wherein the lower boom is pivotally coupled to the base assembly, further comprising an additional linear actuator including a base portion coupled to the base assembly and an extendable portion coupled to the lower boom.

6. The boom system of claim 1, further comprising a coupler plate configured to receive the first implement and a linear actuator configured to adjust an angle of the coupler plate.

7. The boom system of claim 1, wherein:

the plurality of boom sections further comprises a second boom section adjacent to the lower boom section, a third boom section adjacent to the second boom section, a fourth boom section adjacent to the third boom section;

the upper boom section is adjacent to the fourth boom section;

the boom sections are coaxial about a longitudinal centerline of each boom section;

the upper boom section is configured to retract into an inner cavity of the fourth boom section;

the fourth boom section is configured to retract into an inner cavity of the third boom section;

the third boom section is configured to retract into an inner cavity of the second boom section; and the second boom section is configured to retract into an inner cavity of the lower boom section.

8. The boom system of claim 1, wherein the first implement includes a pair of forks and the second implement includes a hook.

9. A boom system comprising:

a base assembly;

a boom assembly comprising:

a boom including a plurality of boom sections, wherein at least one of the plurality of boom sections is configured to extend and retract to increase and decrease a length of the boom, the plurality of boom sections including:

a lower boom section coupled to and extending away from the base assembly and defining a proximal end of the boom, and an upper boom section defining a distal end of the boom;

an a first implement coupled to one of the plurality of boom sections, wherein the first implement comprises forklift forks; and a second implement positioned at the distal end of the boom, wherein the second implement comprises a hook and wherein the forklifts forks are configured to cooperate with the hook to restrict rotation of a load suspended from the hook;

wherein the boom sections are coaxial about a longitudinal centerline of each boom section, and wherein each of the boom sections other than the lower boom section is configured to retract into an inner cavity of at least one other boom section, and a controller communicably coupled with the boom assembly, wherein the controller comprises one or more memory devices coupled to one or more processors, the one or more memory devices configured to store instructions thereon that, when executed by the one or more processors, cause the one or more processors to communicate with the boom assembly to control the plurality of boom sections such that a minimum distance between the first implement and the boom assembly is maintained.

10. The boom system of claim 9, further comprising a cradle coupled to one of the plurality of boom sections, wherein at least one boom section of the plurality of boom sections is configured to retract until the load is received by the cradle.

11. The boom system of claim 10, wherein the cradle comprises a width and a height, and wherein and wherein the width is greater than the height.

12. A boom system comprising:

a boom with a plurality of boom sections including a lower boom section defining a proximal end of the boom and an upper boom section defining a distal end of the boom, each boom section other than the lower boom section configured to extend and retract independently of the other boom sections, a controller communicably coupled with a plurality of linear actuators coupled to the boom, at least one of the plurality of linear actuators configured to cause a boom section to extend or retract or to cause an angle of the boom relative to a work surface to increase or decrease;

wherein the controller comprises one or more memory devices coupled to one or more processors, the one or more memory devices configured to store instructions thereon that, when executed by the one or more processors, cause the one or more processors to communicate with the linear actuators to control the extension of the boom sections and the angle of the boom relative to the work surface, and wherein the boom system comprises a first implement coupled to the distal end of the boom and a second implement coupled to a boom section other than the upper boom section, and wherein the one or more processors control the linear actuators such that a minimum lateral distance between the first implement and the second implement is maintained.

13. The boom system of claim 12, wherein:

the plurality of boom sections comprises an intermediate boom section positioned between the upper boom section and the lower boom section;

the second implement is coupled to the intermediate boom section; and wherein the one or more processors control the linear actuators such that one or more of the boom sections distal to the intermediate boom section extend to create the minimum lateral distance between the first implement and the second implement before the intermediate boom section can be extended.

14. The boom system of claim 12, wherein the one or more processors control the linear actuators such that each boom section remains retracted until each more proximal boom section, other than the lower boom section, is fully extended.

15. The boom system of claim 12, wherein the one or more processors control the linear actuators such that the upper boom section remains retracted until all of the other boom sections, other than the lower boom section, are fully extended.

16. The boom system of claim 12, further comprising a weight sensor communicably coupled to the controller and configured to measure a load on at least one of the hook or the pair of forks, wherein the controller is configured to limit an extension of the boom based on the load.

17. The boom system of claim 12, wherein the first implement comprises a pair of forks and the second implement comprises a hook.

* * * * *